United States Patent
Lee et al.

(10) Patent No.: US 11,352,468 B2
(45) Date of Patent: Jun. 7, 2022

(54) PERFUME MICROCAPSULES AND RELATED FILM AND DETERGENT COMPOSITIONS

(71) Applicants: MONOSOL, LLC, Merrillville, IN (US); Givaudan SA, Vernier (CH)

(72) Inventors: David M. Lee, Crown Point, IN (US); Yashodhan S. Parulekar, Crown Point, IN (US); Jonathon Knight, Laporte, IN (US); Stephanie Kolb, Asnieres-sur-Seine (FR)

(73) Assignees: MONOSOL, LLC, Merrillville, IN (US); Givaudan SA, Vernier (CH)

( * ) Notice: Subject to any disclaimer, the term of this patent is extended or adjusted under 35 U.S.C. 154(b) by 439 days.

(21) Appl. No.: 16/088,174

(22) PCT Filed: Apr. 18, 2017

(86) PCT No.: PCT/US2017/028141
§ 371 (c)(1),
(2) Date: Sep. 25, 2018

(87) PCT Pub. No.: WO2017/184606
PCT Pub. Date: Oct. 26, 2017

(65) Prior Publication Data
US 2020/0299473 A1    Sep. 24, 2020

Related U.S. Application Data

(60) Provisional application No. 62/324,145, filed on Apr. 18, 2016.

(51) Int. Cl.
| | | |
|---|---|---|
| C11D 17/04 | (2006.01) | |
| C11D 17/06 | (2006.01) | |
| C11D 3/50 | (2006.01) | |
| C11D 3/37 | (2006.01) | |
| C08J 5/18 | (2006.01) | |
| B01J 13/14 | (2006.01) | |
| C08J 3/21 | (2006.01) | |
| C08K 5/053 | (2006.01) | |
| C08K 9/10 | (2006.01) | |
| C08L 29/04 | (2006.01) | |
| C11D 17/00 | (2006.01) | |

(52) U.S. Cl.
CPC ............... *C08J 5/18* (2013.01); *B01J 13/14* (2013.01); *C08J 3/212* (2013.01); *C08K 5/053* (2013.01); *C08K 9/10* (2013.01); *C08L 29/04* (2013.01); *C11D 3/505* (2013.01); *C11D 17/0039* (2013.01); *C11D 17/042* (2013.01); *C11D 17/06* (2013.01)

(58) Field of Classification Search
None
See application file for complete search history.

(56) References Cited

U.S. PATENT DOCUMENTS

| | | |
|---|---|---|
| 2,220,099 A | 11/1940 | Guenther et al. |
| 2,477,383 A | 7/1949 | Lewis |
| 2,800,457 A | 7/1957 | Green et al. |
| 2,800,458 A | 7/1957 | Green |
| 3,516,941 A | 6/1970 | Matson |
| 3,664,961 A | 5/1972 | Norris |
| 3,919,678 A | 11/1975 | Penfold |
| 3,929,678 A | 12/1975 | Laughlin et al. |
| 3,975,280 A | 8/1976 | Hachmann et al. |
| 4,000,093 A | 12/1976 | Nicol et al. |
| 4,075,116 A | 2/1978 | Mesaros |
| 4,145,184 A | 3/1979 | Brain et al. |
| 4,222,905 A | 9/1980 | Cockrell, Jr. |
| 4,239,659 A | 12/1980 | Murphy |
| 4,246,612 A | 1/1981 | Berry et al. |
| 4,259,217 A | 3/1981 | Murphy |
| 4,520,142 A | 5/1985 | Leinen |
| 4,528,226 A | 7/1985 | Sweeny |
| 4,681,806 A | 7/1987 | Matkan et al. |
| 4,810,410 A | 3/1989 | Diakun et al. |
| 4,946,624 A | 8/1990 | Michael |
| 5,114,611 A | 5/1992 | Van Kralingen et al. |
| 5,137,646 A | 8/1992 | Schmidt et al. |
| 5,154,842 A * | 10/1992 | Walley ............. C11D 3/505 510/101 |
| 5,227,084 A | 7/1993 | Martens et al. |
| 5,340,496 A | 8/1994 | Sato et al. |
| 5,576,281 A | 11/1996 | Bunch et al. |
| 6,599,871 B2 | 7/2003 | Smith |
| 6,660,708 B2 | 12/2003 | Kaess |
| 6,951,836 B2 | 10/2005 | Jahns et al. |
| 7,127,874 B2 | 10/2006 | Viltro et al. |
| 7,786,027 B2 | 8/2010 | Aouad et al. |

(Continued)

FOREIGN PATENT DOCUMENTS

| | | |
|---|---|---|
| CN | 102666826 A | 9/2012 |
| DE | 102009029292 A1 | 3/2011 |

(Continued)

OTHER PUBLICATIONS

International Application No. PCT/US2017/028141, International Search Report and Written Opinion, dated Oct. 25, 2017.
International Application No. PCT/US2017/028141, International Preliminary Report on Patentability, dated Oct. 23, 2018.
International Application No. PCT/US2017/028141, Invitation to Pay Additional Fees, dated Jul. 12, 2017.
Chinese Patent Application No. 201780021044.4, First Office Action, dated Apr. 17, 2020.
Japanese Patent Application No. 2018-554756, Office Action, dated Apr. 19, 2021.

*Primary Examiner* — Lorna M Douyon

(57) ABSTRACT

Perfume microcapsule-containing films, related solutions, and containers including the films (e.g. detergent packets) are disclosed, together with their methods of preparation and use.

33 Claims, 3 Drawing Sheets

(56) References Cited

U.S. PATENT DOCUMENTS

| | | |
|---|---|---|
| 7,799,752 B2 | 9/2010 | Ness et al. |
| 7,867,968 B1 | 1/2011 | Aouad |
| 7,868,968 B2 | 1/2011 | Sudo |
| 7,871,976 B1 | 1/2011 | Aouad |
| 7,964,549 B2 | 6/2011 | Boutoille et al. |
| 8,119,587 B2 | 2/2012 | Cavin et al. |
| 8,288,332 B2 | 10/2012 | Fossum et al. |
| 2003/0060390 A1 | 3/2003 | Demeyere et al. |
| 2003/0126282 A1 | 7/2003 | Sarkar et al. |
| 2003/0139312 A1 | 7/2003 | Caswell et al. |
| 2004/0092635 A1* | 5/2004 | Kitamura .............. C08J 5/18 524/386 |
| 2004/0204337 A1 | 10/2004 | Corona et al. |
| 2007/0138674 A1 | 6/2007 | Anastasiou et al. |
| 2007/0219111 A1 | 9/2007 | Ward et al. |
| 2007/0269651 A1 | 11/2007 | Denome et al. |
| 2008/0014393 A1 | 1/2008 | Denome et al. |
| 2009/0215664 A1 | 8/2009 | Raehse |
| 2009/0298739 A1 | 12/2009 | Courchay et al. |
| 2010/0009893 A1* | 1/2010 | Cavin .................. A61K 8/86 510/441 |
| 2010/0305020 A1 | 12/2010 | Jennewein |
| 2013/0273277 A1 | 10/2013 | Lee et al. |
| 2014/0162929 A1 | 6/2014 | Labeque et al. |
| 2014/0345064 A1 | 11/2014 | Koch et al. |
| 2015/0376550 A1 | 12/2015 | Ohtani et al. |
| 2017/0233539 A1 | 8/2017 | Friedrich et al. |
| 2018/0185808 A1* | 7/2018 | Aussant ............... A61K 8/11 |

FOREIGN PATENT DOCUMENTS

| | | |
|---|---|---|
| EP | 0197434 B1 | 7/1989 |
| EP | 376385 A2 | 7/1990 |
| EP | 385534 A1 | 9/1990 |
| EP | 0414549 A2 | 2/1991 |
| EP | 507402 A1 | 10/1992 |
| EP | 2111214 A1 | 10/2009 |
| EP | 2169042 A1 | 3/2010 |
| EP | 2021172 B1 | 5/2010 |
| EP | 2258820 A1 | 12/2010 |
| EP | 2336285 A1 | 6/2011 |
| EP | 2336286 A1 | 6/2011 |
| EP | 2545988 A2 | 1/2013 |
| EP | 2049587 B1 | 3/2013 |
| EP | 2757146 A1 | 7/2014 |
| GB | 929403 A | 6/1963 |
| GB | 1137741 A | 12/1968 |
| GB | 1466799 A | 3/1977 |
| GB | 2073132 A | 10/1981 |
| JP | 2002-047426 A | 2/2002 |
| JP | 2002-102680 A | 4/2002 |
| JP | 2015-078378 A | 4/2015 |
| WO | WO-93/08874 A1 | 5/1993 |
| WO | WO-93/08876 A1 | 5/1993 |
| WO | WO-94/22800 A1 | 10/1994 |
| WO | WO-2011/075425 A1 | 6/2011 |

\* cited by examiner

PERFUME MICROCAPSULES AND RELATED FILM AND DETERGENT COMPOSITIONS

This is the U.S. National Stacie of PCT/US2017/028141, filed Apr. 18, 2017, which claims the benefit under 35 U.S.C. § 119(e) of U.S. Provisional Patent Application No. 62/324,145 filed Apr. 18, 2016, and the disclosure thereof is incorporated herein by reference.

NAMES OF PARTIES TO A JOINT RESEARCH AGREEMENT

The parties are MonoSol, LLC and Givaudan France Fragrances SAS.

BACKGROUND

Field of the Disclosure

The disclosure relates generally to stable incorporation of perfume compositions into laundry detergent products, to deliver a long-lasting olfactory impression on fabrics treated with said products. More particularly, the disclosure relates to particular perfume microcapsule compositions, water-soluble films containing such microcapsules, and detergent products incorporating such films.

Brief Description of Related Technology

Consumers have become familiar with the benefits of perfumed detergent products, and they expect that fabrics and other items that have been laundered with these products should have a pleasing fresh odour over prolonged periods of time. In order to respond to this demand, the consumer product industry has made extensive use of perfume microcapsules as a means of depositing perfume onto fabrics and to release the deposited perfume in a controlled manner over time.

However, liquid detergent products contain surfactants and other ingredients, which can be quite aggressive both to microcapsules and to perfume ingredients encapsulated within them. It has been extensively documented in the literature that encapsulated perfume compositions in such products exhibit poor stability. In particular, it is known that surfactants can act on the integrity of microcapsules, resulting in microcapsule leakage and loss of perfume. Furthermore, once outside the protective environment of the microcapsules, perfume can be lost to evaporation or chemically degraded by the harsh surrounding environment.

Some laundry detergents are less aggressive towards perfume microcapsules. For example, it is known that microcapsules are stable in so-called structured liquid detergent compositions, in which perfume microcapsules are stably incorporated and the microcapsules can deliver fragrance to fabrics in a desired fashion. Comparatively, other laundry detergent product formats are far more aggressive towards microcapsules.

Water-soluble films are known for use in creating pouches to deliver cleaning actives in single unit dose form. Unit dose laundry detergent products generally consist of thin polymeric water-soluble films that are folded or shaped into the form of a pouch or capsule, defining a cavity which is filled with a highly concentrated detergent composition. A feature of these products is their ability to hold small volumes of detergent composition which are a single unit dose. Furthermore, owing to the aqueous instability of the films, high water content within the detergent cannot be tolerated. Consequently, these products contain extremely high concentrations of surfactant, which can interact with the shells of perfume microcapsules as well as the perfume ingredients encapsulated within them.

Whereas, it has been suggested generally in the prior art that microcapsules could be incorporated within such films, but in practice, incorporation of perfume into commercial unit dose liquid detergent products has been achieved either by applying a coating of perfume microcapsules onto the surface of the pouches or capsules; or perfume ingredients that are able to withstand concentrated surfactants can be incorporated directly into the detergent composition.

Some water-soluble film materials, including polyvinyl alcohol, can have an unpleasant acidic odor. The odor is perceptible especially when opening secondary packaging which holds such single unit dose packages. Cleaning actives, including laundry detergents often contain fragrances, but the single unit dose configuration (film encompassing detergent composition) prevents the fragrances from being significantly perceived until the detergent is released. Accordingly, there is also a need for addressing the unpleasant odor.

Fragrances in cleaning compositions, including laundry detergents, are removed in the wash cycle to a large degree, and often do not remain on the laundered items, such as textiles, to a sufficient degree. Thus, there is a need for a single unit dose cleaning article which delivers fragrance to textiles for a long-lasting olfactory effect.

SUMMARY

A first aspect of the disclosure is a film having an average thickness in a range of about 5 μm to about 200 μm, the thickness including a mixture of a water-soluble polymer, one or more plasticizers, and a plurality of perfume fragrance-containing aminoplast resin microcapsules comprising a median (d50) particle size of at least about 12 μm and a shell comprising 75 to 100% by weight of an aminoplast resin that includes 50 to 90% by weight of a terpolymer and 10-50% by weight of a polymeric stabilizer, wherein the terpolymer comprises moieties derived from at least one triamine, moieties derived from at least one diamine, optionally urea, and moieties selected from the group consisting of alkylene and alkylenoxy moieties. The aminoplast resin microcapsule can be formed by a process including the steps of: adding and dissolving polymer stabilizer in water under shear mixing; adjusting the temperature and pH of the solution, then adding alkylolated triamine or triamine precondensate, diamine or diamine precondensate, and perfume; emulsifying the system under shear mixing, whereby the stirring speed and the geometry of the mixer is defined as a function of the desired average microcapsule size range and microcapsule size distribution; warming the emulsified system, then holding the system at elevated temperature for at least one hour; adding ethylene urea as formaldehyde scavenger while the slurry is still at elevated temperature; cooling the system, e.g. to room temperature; and optionally adding a suspending agent then adding NaOH and optionally adjusting pH.

Another aspect of the disclosure herein is a container including a film as described herein, e.g. disposed as a wall of the container.

Still another aspect of the disclosure herein is a method of making a perfume-containing water-soluble film, including the steps of: forming a mixed aqueous solution comprising a polymer resin and a plasticizer, optionally with heating;

degassing the mixture; adding perfume-containing microcapsules to the degassed solution to form a suspension; mixing the suspension; casting the suspension onto a surface; and allowing the suspension to substantially dry.

For the compositions and methods described herein, optional features, including but not limited to components, compositional ranges thereof, substituents, conditions, and steps, are contemplated to be selected from the various aspects, embodiments, and examples provided herein.

Further aspects and advantages will be apparent to those of ordinary skill in the art from a review of the following detailed description, taken in conjunction with the drawings. While the film, packet, and methods of making and use are susceptible of embodiments in various forms, the description hereafter includes specific embodiments with the understanding that the disclosure is illustrative, and is not intended to limit the invention to the specific embodiments described herein.

BRIEF DESCRIPTION OF THE DRAWINGS

For further facilitating the understanding of the present invention, four drawing figures are appended hereto.

DETAILED DESCRIPTION

Figure 1:
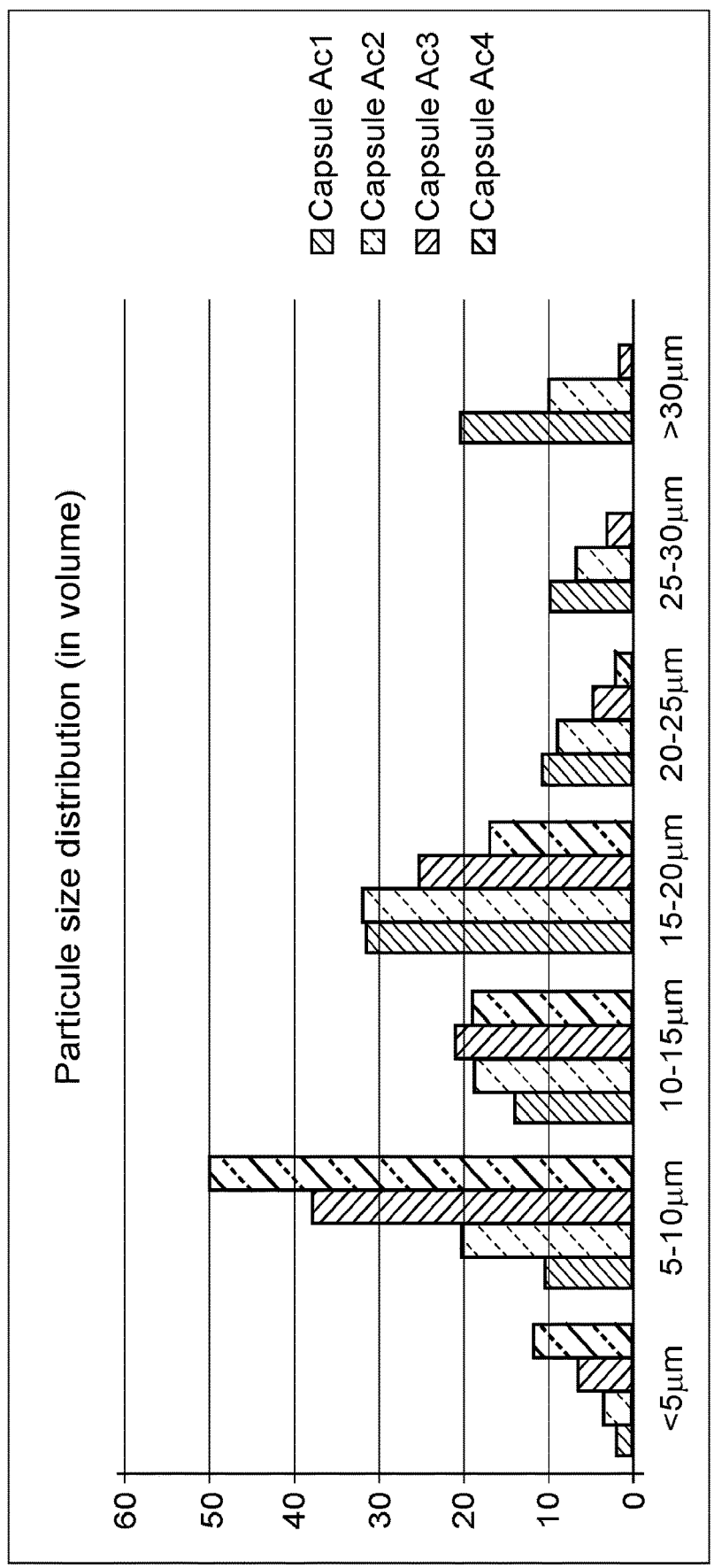
FIG. 1 shows particle size distributions for example microcapsules for use in the films described herein and the films used in Example 1.

It was found that incorporation of perfume-containing microcapsules into water-soluble films, and subsequently delivering perfume to a fabric and releasing it in a desirable manner was not a trivial undertaking. For functional reasons (the films must disintegrate, dissolve or degrade rapidly in water); environmental reasons (the films are considered to be packaging); and regulatory reasons (European CLP regulations limit the volume of pouches/capsules to less than 25 ml unless film further comprises pictographs), the amount of film that can be used per unit dosage form is limited. Loading small amounts of film with sufficient microcapsules, to provide an impactful odor impression, whilst at the same time ensuring that the olfactory effect was maintained in connection with laundered articles, presented considerable challenges in terms of microcapsule and perfume design.

Furthermore, although incorporation of microcapsules within the film can provide somewhat of a barrier, so they are not mixed in with the harsh concentrated laundry composition surfactants during storage, nevertheless, contents, such as perfume, may be lost from the cores of microcapsules. Merely strengthening the microcapsule shell is not an adequate solution to the problem, because although in this way it might be possible to improve microcapsule integrity and reduce or prevent perfume leakage, the mechanical strength of the microcapsules can be increased to the extent that there is no rupture and release of perfume from the microcapsules once they are deposited on fabric.

In addressing the problem of incorporating perfume-containing microcapsules into water-soluble films, it was found that by controlling one or more parameters including microcapsule shell content, microcapsule size, microcapsule loading and perfume loading, the microcapsules could be stably incorporated into the films, and in-use, they can deposit onto fabrics to deliver long-lasting fragrance impressions.

Accordingly, provided herein in a first aspect is a perfume composition comprising a plurality of perfume-containing microcapsules, described below, adapted to be dispersed in a film comprising polyvinyl alcohol, wherein the microcapsules have a median (d50) particle size of 12 to 50 microns.

Another aspect of the disclosure is a plasticized polymer film containing a water-soluble polymer resin and perfume-containing microcapsules described below. Also provided herein are related articles made from such films, including containers, related methods of making such films, and methods of using such films and containers.

Incorporating microcapsules, and microencapsulated additives, into a film and single unit dose application as described herein allows for improved microcapsule stability in a convenient single unit dose format. This function allows for targeted delivery of microencapsulated additives, and longer product stability.

An advantage of the unit dosage pouch or capsule product formats is that a precise dose of detergent, softener and fragrance can be delivered from each unit dosage form. In conventional liquid detergent compositions, the efficacy of cleaning and conditioning of fabric, as well as the intensity of perfume deposited on fabric using conventional liquid laundry detergent compositions will depend largely on the accuracy with which the individual consumer doses a laundry detergent product. Over-dosing or under-dosing are common occurrences.

A standard guideline for formulators of liquid laundry detergent compositions is that for a 35 gram dose of detergent composition, the composition should contain around 0.07 grams of perfume microcapsules in order to obtain a satisfactory, long-lasting olfactory impression on fabric. However, despite the aforementioned advantages associated with unit dosage detergent products, the means of incorporating a high enough concentration of microcapsules within a film, which contains a high enough loading of perfume composition to achieve a concentration of perfume microcapsules in the film that is equivalent to the 0.07 gram per 35 gram dose common in liquid detergent compositions, has eluded prior practitioners.

Surprisingly, it was found that a perfume composition of the present disclosure can be incorporated within a film in a concentration that is at least equivalent to 0.07 gram of perfume microcapsules/35 grams of liquid detergent composition. In alternative embodiments, the perfume loading can be lower.

Accordingly, provided herein in another aspect is a perfume composition comprising a plurality of perfume-containing microcapsules having an average particle size of 12 to 50 microns, dispersed in a plasticized water-soluble film (e.g. comprising polyvinyl alcohol), wherein the film forms a part of a unit dosage form detergent composition, and wherein the weight of perfume-containing microcapsules in the film is in the range of 0.03 to 0.5 grams.

In yet another aspect of the present disclosure there is provided a perfume composition comprising a plurality of perfume-containing microcapsules having an average particle size of 12 to 50 microns, dispersed in a film comprising a plasticized polyvinyl alcohol, wherein the film forms a part of a unit dosage form detergent composition; the weight of perfume-containing microcapsules in the film is in a range of 0.03 to 0.5 grams, and wherein the loading of perfume in the microcapsules is 60 to 95% by weight of the microcapsules.

As mentioned above, liquid detergents often contain highly concentrated actives which are very aggressive to other additives, including microcapsules and microencapsulated additives. Encapsulating the additives (such as perfumes) as described herein and incorporating the resulting microcapsules into film of a single unit dose pouch allows for increased stability of the additives in the single unit dose detergent pouch. This stability allows for sustained performance of additives over longer periods of time, as well as enabling deposition of additives onto textiles.

The microcapsule compositions, related films, related pouch articles, and methods are contemplated to include embodiments including any combination of one or more of the additional optional elements, features, and steps further described below (including those shown in the figures and described in the Examples), unless stated otherwise.

Throughout this specification and the claims which follow, unless the context requires otherwise, the word "comprise" and variations such as "comprises" and "comprising" as used herein means that various components, ingredients or steps can that be conjointly employed in practicing the present disclosure, implying the inclusion of a stated integer or step or group of integers or steps but not the exclusion of any other integer or step or group of integers or steps. Accordingly, the term "comprising" encompasses the more restrictive terms "consisting essentially of" and "consisting of". The present compositions can comprise, consist essentially of, or consist of any of the required and optional elements disclosed herein.

All ranges set forth herein include all possible subsets of ranges and any combinations of such subset ranges. By default, ranges are inclusive of the stated endpoints, unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

The dimensions and values disclosed herein are not to be understood as being strictly limited to the exact numerical values recited. Instead, unless otherwise specified, each such dimension is contemplated to be the recited value in one type of embodiment, and a functionally equivalent range surrounding that value in other embodiments. For example, a dimension disclosed as "40 mm" can be "about 40 mm" in another embodiment.

As used herein and unless specified otherwise, the terms "wt. %" and "wt %" are intended to refer to the composition of the identified element in "dry" (non-water) parts by weight of the entire film (when applicable) or parts by weight of the entire composition enclosed within a pouch (when applicable). As used herein and unless specified otherwise, the term "phr" is intended to refer to the composition of the identified element in parts per one hundred parts water-soluble polymer (or resin; whether polyvinyl alcohol or otherwise) in the water-soluble film.

All viscosities specified herein in Centipoise (cP) should be understood to refer to the viscosity of 4% aqueous solution at 20° C., unless specified otherwise.

As used herein, particle size distributions are described on a volume basis. Thus, d50 is the size that splits the particle size distribution, with half of the particles (by volume) having diameters larger than the d50 value and half the particles having diameters smaller than the d50 value.

Microcapsules

The term "microcapsule" used herein is well understood in the perfumery arts, and refers to a spherical or substantially spherical hollow shell, which is formed of a water-insoluble, or at least partially soluble material, usually a polymeric material, within which perfume ingredients are contained.

Many different types of microcapsules have been proposed in the art for encapsulating perfume compositions. The microcapsules of the present disclosure may be prepared using a range of conventional methods and auxiliary materials known to those skilled in the art.

For example, microcapsules can be formed by physicochemical means, such as internal phase separation, layer-by-layer poly-electrolyte deposition, sol-gel processes or coacervation; or chemical means such as interfacial polymerization, in-situ polymerization and polycondensation.

The process of coacervation typically involves encapsulation of a generally water-insoluble material by the precipitation of colloidal material(s) onto the surface of droplets of pefume composition. Coacervation may be simple e. g. using one colloid such as gelatine, or complex where two or possibly more colloids of opposite charge, such as gelatine and gum arabic or gelatine and carboxymethylcellulose, are used under carefully controlled conditions of pH, temperature and concentration. Coacervation techniques are described, e.g. in U.S. Pat. Nos. 2,800,458, 2,800,457, GB929403, EP385534 (and counterpart U.S. Pat. No. 4,946,624), and EP376385, which are herein incorporated by reference.

In a process interfacial polymerization, two reactants that react by polycondensation meet at an oil-water interface to produce shells from the reaction of at least one oil-soluble wall forming material present in an internal oil phase with at least one water-soluble wall forming material present in an aqueous external phase. A polymerization reaction between the two wall-forming materials occurs resulting in the formation of covalent bonds at the interface of the oil and aqueous phases to form a microcapsule wall. Examples of microcapsules produced by this method are polyamide and polyurethane microcapsules.

Polycondensation involves forming a dispersion or emulsion of perfume droplets in an aqueous continuous phase containing a pre-condensate of polymeric materials under appropriate conditions of agitation to produce microcapsules of a desired size, and adjusting the reaction conditions to cause condensation of the pre-condensate by acid catalysis, resulting in the condensate separating from solution and surrounding the dispersed perfume droplets to produce a coherent film and the desired microcapsules. Polycondensation techniques are described in U.S. Pat. Nos. 3,516,941, 4,520,142, 4,528,226, 4,681,806, 4,145,184 and GB2073132, which are herein incorporated by reference.

A method for forming microcapsules useful in performance of the present invention is polycondensation, typically to produce aminoplast or poylurea microcapsules. Alternatively, microcapsules can be obtained by oil-mediated radical polymerization-phase separation, as described in U.S. Pat. No. 6,951,836 B2, or by interfacial radical polymerization.

Aminoplast resins used in the formation of the microcapsules may be formed of any of the amino aldehyde resins known in the art. The amino aldehyde resin may be a polymer or copolymer of at least one amine, including but not limited to thiourea, alkyl urea, 6-substituted-2,4-diamino-1,3,5-triazines such as benzoguanamine or glycoluril, and melamine; and at least one aldehyde, such as formaldehyde, acetaldehyde, glyoxal or glutaraldehyde.

The aminoaldehyde resin may be formed either by polycondensation of the above-mentioned monomers, or by first preparing water-soluble amino aldehyde pre-polymers of the above monomers and performing a poly-condensation reaction with said pre-polymers. A further alternative is to carry out a poly-condensation reaction on both monomers and pre-polymers.

In one type of embodiment, melamine-formaldehyde pre-polymers are used in the formation of aminoplast microcapsules. Melamine-formaldehyde pre-polymers are formed by the reaction of melamine with formaldehyde to form methylolated melamine. Methylolated melamine may also be treated with methanol to form methoxymethylated methylol melamine.

In addition to these monomers or pre-polymers, the aminoplast resin may contain residues from cross-linkers. Suitable cross-linkers for use in the preparation of the aminoplast resin are aliphatic, aromatic or polymeric polyols. Suitable polyols may be selected from the group consisting of phenol, 3,5-dihydroxy toluene, Bisphenol A, resorcinol, hydroquinone, xylenol, polyhydroxy naphthalene and polyphenols produced by the degradation of cellulose and humic acids. Examples of suitable aliphatic polyols include, but are not limited to 2,2-dimethyl-1,3-propane diol, 1,1,1-tris-(hydroxymethyl)-propane, pentaerythritol, sorbitol, sugars and the like.

Aminoplast resin microcapsules comprising condensates of polyol cross-linkers, and more particularly resorcinol cross-linkers are disclosed in EP 2111214 (and counterpart U.S. Pat. No. 8,119,587 B2).

Aminoplast resins are inter-linked and complex structures, which are believed to be formed of amino aldehyde condensate moieties and cross-linker condensate moieties. The relative amounts of these condensate moieties will be determined by the amounts of monomers, pre-polymers and cross-linkers employed in any poly-condensation reaction.

A particular aminoplast microcapsule can be formed of amino aldehyde condensate moieties and diamine cross-linker condensate moieties.

Still more particularly, the aminoplast microcapsule can comprise a shell composed of from 75-100% by weight of an aminoplast resin that comprises 50-90% by weight, or 60-85% by weight, of a terpolymer and 10-50% by weight, or 10-25% by weight, of a polymeric stabilizer, and wherein said terpolymer comprises:

(a) 20 to 40% by weight, or 25 to 30% by weight of moieties derived from at least one triamine, (b) 25 to 60% by weight, or 30 to 55% by weight of moieties derived from at least one diamine, (c) 19-35% by weight, or 21-33% by weight of moieties selected from the group consisting of alkylene and alkylenoxy moieties having 1 to 6 methylene units, or 1 to 4 methylene units, or 1 methylene unit.

Such aminoplast microcapsules are alternatives to the known polyol cross-linker-containing microcapsules disclosed in EP 2111214 (and counterpart U.S. Pat. No. 8,119, 587 B2), wherein the diamine cross-linker condensate moieties replace the polyol cross-linker moieties.

Diamines or triamines can be selected from alkylolated polyamines. Suitable alkylolated polyamines include mixtures of mono- or polyalkylolated polyamines, which in turn may be partially alkylated with alcohols having from 1 to 6 methylene units. Alkylated polyamines especially suitable include mono- and polymethylol-urea pre-condensates, such as those commercially available under the Trade Mark URAC (ex. Cytec Technology Corp.) and/or partially methylated mono- and polymethylol-1,3,5-triamino-2,4,6-triazine pre-condensates, such as those commercially available under the Trade Mark CYMEL (ex. Cytec Technology Corp.) or LURACOLL (ex. BASF), and/or mono- and polyalkylol-benzoguanamine pre-condensates, and/or mono- and polyalkylol-glycouril pre-condensates. These alkylolated polyamines may be provided in partially alkylated forms, obtained by addition of short chain alcohols having typically 1 to 6 methylene units. These partially alkylated forms are known to be less reactive and therefore more stable during storage. Preferred polyalkylol-polyamines are polymethylol-melamines and polymethylol-1-(3,5-dihydroxy-methylbenzyl)-3,5-triamino-2,4,6-triazine.

Alternatively, poly[N-(2,2-dimethoxy-1-hydroxy)] polyamines can be used, including di-[N-(2,2-dimethoxy-1-hydroxy)] urea, tri-[N-(2,2-dimethoxy-1-hydroxy)] melamin, tetra-[N-(2,2-dimethoxy-1-hydroxy)] glycouryl and di-[N-(2,2-dimethoxy-1-hydroxy)] benzoguanidin.

A moiety derived from a triamine is a chemical entity having three amino groups and wherein one, two or all three of the amino groups react with a shell-forming material containing a functional group reactive with an amino group to form at least a part of the terpolymer. As it has three amino groups it can be considered to be a tridentate polyamine, however it is possible, that not all of the amine groups react, so it might also serve as a monodentate or bidentate ligand. A suitable triamine includes, but is not limited to melamine.

A moiety derived from a diamine is a chemical entity having two amino groups, one or both of which has reacted with a shell-forming material containing a functional group reactive with the diamine to form at least a part of the terpolymer. As it has two amino groups it may be mono-dentate or bidentate polyamine. A suitable moiety-forming diamine includes, but is not limited to, urea, benzoguanamine and 3-substituted 1,5-diamino-2,4,6-triazin.

The polymeric stabilizer prevents the microcapsules from agglomerating, thus acting as a protective colloid. It is added to the emulsion containing a monomer mixture or a pre-polymer prior to polymerization, and this results in its being partially retained by the polymer.

Particular examples of suitable polymeric stabilizers include acrylic copolymers bearing sulfonate groups, including those available commercially under the trade mark LUPASOL (ex. BASF), such as LUPASOL PA 140 or LUPASOL VFR; copolymers of acrylamide and acrylic acid, copolymers of alkyl acrylates and N-vinylpyrrolidone, including those available under the trade mark Luviskol (e.g. LUVISKOL K 15, K 30 or K 90 ex BASF); sodium polycarboxylates (ex. Polyscience Inc.) or sodium poly (styrene sulfonate) (ex. Polyscience Inc.); vinyl and methyl vinyl ether-maleic anhydride copolymers (e.g. AGRIMER™ VEMATM AN, ex ISP), and ethylene, isobutylene or styrene-maleic anhydride copolymers (e.g. ZEMAC). Hence the polymer stabilizers can be anionic polyelectrolytes.

In a particular aspect, the at least one triamine can be melamine.

In a further aspect, the at least one diamine can be urea.

According to prior art, for example EP 2545988 A2 (and counterpart U.S. Patent Application Publication No. 2007138674 A1), urea is used as a formaldehyde scavenger and is added to the mixture after shell formation. Therefore it is not incorporated into the terpolymer of which the shell is formed.

In the present invention, in the formation of aminoplast microcapsules, urea is employed as the diamine, and it is added to the mixture prior to microcapsule shell formation, in order that it can be incorporated chemically into the terpolymer to form diamine moieties.

Thus, the present invention uses urea in a new way. The applicant has surprisingly found that when urea is incorporated into the terpolymer, the formed microcapsules display good leakage stability while showing no discoloration issues.

In another aspect of the invention, the moiety selected from the group consisting of alkylene and alkylenoxy moieties is formaldehyde. Alternatively, glutaraldehyde, glyoxal or anhydrides may be used as cross-linking agent.

Preferably, the terpolymer of the shell comprises moieties derived from melamine, urea and formaldehyde.

The applicant has furthermore surprisingly found that the optimal leakage stability of microcapsules was obtained within a narrow range of urea to melamine ratio. Hence, in a preferred embodiment, microcapsules with a terpolymer having an urea to melamine and urea in a ratio of about 0.5 to 1.5 are preferred, preferably of about 0.8 to 1.2 are preferred.

In a further aspect, the microcapsules can be formed with multi-layered shells. The microcapsules can be formed with bilayer or trilayer shells. Each single layer of the shell of the microcapsule can be formed of the aminoplast polymer defined hereinabove.

Multi-layered microcapsules can be formed by a process substantially analogous to a process of forming a single layered microcapsule. After a single layer microcapsule is formed, the shell-forming process is repeated to form second or subsequent layers. A bilayered microcapsule can be regarded as a microcapsule consisting of an inner and an outer shell. Such multi-layered microcapsules show improved leakage stability in films, including polyvinyl alcohol films.

Microcapsules with a shell formed by a single step leading to one layer possess a layer wall thickness of about 50-250 nm. Microcapsules with a shell comprising of two layers, that is a capsule consisting of an inner and an outer shell, have a wall thickness of about 50-500 nm.

The different shells of a microcapsule may have the same composition. However, in another aspect, the inner and outer shell of a microcapsule can have different compositions, allowing to fine tune the properties of the microcapsule.

Preferred aminoplast microcapsules may be obtained by following the steps of:

1. Adding and dissolving polymer stabilizer in water under moderate shear mixing;
2. Adjusting the temperature to $35\pm2°$ C., the pH to $4.6\pm2$ (e.g. with NaOH), then adding the alkylolated triamine or triamine pre-condensates, diamine or diamine precondensate, and perfume;
3. Emulsifying the system under moderate to high shear mixing, whereby the stirring speed and the geometry of the mixer is defined as a function of the desired average microcapsule size range and microcapsule size distribution;
4. Increasing the temperature to $88°$ C.$\pm1°$ C. over a period of 75 min, then leaving the reaction at 88 C$\pm2°$ C. for 2 h 15 min;
Adding ethylene urea as formaldehyde scavenger while the slurry is still hot ($88°$ C.) and then stirring for 10 min;
5. Cooling the system to room temperature; and
6. Optionally adding a suspending agent then adding NaOH and optionally adjusting pH within the range from 6 to 6.6 with formic acid.

To obtain a capsule with a shell of two layers, the steps 4 and 5 in the process described above are amended to:

4. Increasing the temperature to $88°$ C.$\pm1°$ C. over a period of 75 min, then leaving the reaction at 88 C$\pm2°$ C. for 35 min; and
5. optionally adding a deposition agent followed by the addition of a second portion of the alkylolated triamine or triamine pre-condensates and formic acid then leaving the reaction at $88°$ C.$\pm2°$ C. for 2 h 15 min; and
adding ethylene urea as formaldehyde scavenger while the slurry is still hot ($88°$ C.) and then stirring for 10 min.

The perfume composition is characterised by its constituent microcapsules having a defined particle size distribution. The volume average particle size is measured by light scattering-measurements using a Malvern 2000S instrument and the Mie scattering theory. The principle of the Mie theory and how light scattering can be used to measure capsule size can be found, for example H. C. van de Hulst, Light scattering by small particles, Dover, N.Y., 1981. The primary information provided by static light scattering is the angular dependence of the light scattering intensity, which in turn is linked to the size and shape of the microcapsules. However, in a standard operation method, the size of a sphere having a size equivalent to the size of the diffracting object, whatever the shape of this object, is calculated by the Malvern proprietary software provided with the apparatus. In case of polydisperse samples, the angular dependence of the overall scattering intensity contains information about the size distribution in the sample. The output is a histogram representing the total volume of capsules belonging to a given size class as a function of the capsule size, whereas an arbitrary number of 50 size classes is typically chosen.

Experimentally, a few drops of an aqueous dispersion containing about 10% by weight of microcapsules are added to a circulating stream of degased water flowing through a scattering cell. The angular distribution of the scattering intensity is measured and analyzed by Malvern proprietary software to provide the average size and size-distribution of the capsules present in the sample. In the context of the present disclosure, the percentile d90 is used as a characteristics of the capsule size distribution, i.e., 90% of the distribution lies below the d90, whereas d50 corresponds to the median of the distribution, because 50% of the distribution lies below the d50.

Shell weight of the microcapsules is another parameter related to the performance of the perfume compositions described herein. In particular, the shell weight in relation to the volume average diameter of the capsules affects the release characteristics of the encapsulated perfume composition. The ratio of the shell weight (expressed in % by weight of the total capsule weight: shell material+core material) to the capsule diameter (expressed in microns) is about 0.7 microns$^{-1}$ or less, or 0.6 microns$^{-1}$ or less, or 0.2 microns$^{-1}$ or less, for increased stability and performance of the microcapsules.

As stated hereinabove, the perfume composition is adapted to be incorporated into a film, for example one formed from polyvinyl alcohol resin. Conveniently for this purpose, the perfume composition may be presented in the form of a slurry.

Accordingly, in a particular embodiment, the perfume composition is presented in the form of an aqueous slurry of perfume-containing microcapsules dispersed in a suitable dispersing medium.

In embodiments, the slurry can be a physically stable dispersion of microcapsules, that is, the microcapsules can be evenly dispersed throughout the dispersing medium. In such embodiments, the microcapsules would not cream, sediment, or otherwise agglomerate in the dispersing medium. In order to achieve this, the slurry can contain a dispersing aid. The dispersing aid, and the concentration in which it is employed in the slurry, are selected such that the microcapsules are evenly suspended.

Accordingly, in one type of embodiment, the perfume composition is provided in the form of a slurry comprising a plurality of perfume-containing microcapsules dispersed in an aqueous dispersing medium comprising one or more dispersing aids selected from polysaccharides, pectin, alginate, arabinogalactan, carageenan, gellan gum, xanthan gum, guar gum, acrylates/acrylic polymers, starches, water-swellable clays, acrylate/aminoacrylate copolymers, and mixtures thereof, maltodextrin; natural gums such as alginate esters; gelatine, protein hydrolysates and their quaternized forms; synthetic polymers and copolymers, such as poly(vinyl pyrrolidone-co-vinyl acetate), poly(vinyl alcohol-co-vinyl acetate), poly(maleic acid), poly(alkyleneoxide), poly(vinylmethylether), poly(vinylether-co-maleic anhydride), and the like, as well as poly-(ethyleneimine), poly((meth)acrylamide), poly(alkyleneoxide-co-dimethylsiloxane), poly(amino dimethylsiloxane), and the like.

In order to prevent microbial contamination the encapsulated perfume composition may contain a preservative. The preservative may be encapsulated and/or it may be contained in a medium containing the microcapsules, e.g. an aqueous suspending medium of a slurry. Suitable preservatives include quaternary compounds, biguanide compounds, and mixtures thereof, for example.

In embodiments, the slurry, at any given solids content, can have a viscosity of up to 3000 cps when measured on rheometer, for example a RheoStress™ 1 instrument (ThermoScientific), using rotating disks at a shear rate of 21 s$^{-1}$ at a temperature of 25° C. Therefore, another aspect of the encapsulated perfume composition, as hereinabove described, is one wherein the capsules are in the form of a stable suspension having a viscosity of up to 3000 centipoise, and more particularly about 150 to 3000 centipoise when measured on rheometer, for example a RheoStress™ 1 instrument (ThermoScientific), using rotating disks at a shear rate of 21 s$^{-1}$ at a temperature of 25° C.

The concentration of capsules, e.g. employed in a slurry, that is required to obtain a desired perfumery effect, will depend to an extent upon how efficiently perfume can be encapsulated, and in turn, this will be influenced by the amount of shell material employed relative to the amount of core material.

In a particular type of embodiment, the capsule content loading (encapsulated material+shell material) in the slurry is in the range of about 5% to 75%, more particularly 25% to 50%, and still more particularly 30% to 45% by weight based on the weight of the slurry.

Further still, these high loadings of perfume ingredients can be encapsulated despite the relatively low shell weight. Indeed, in another aspect, the amount of core content expressed as weight percentage based on the total weight of the capsules may range from about 60% to 95% by weight, more particularly 75% to 80% and still more particularly 80% to 88% by weight.

The performance of the perfume composition according to the present invention is affected by the nature of the perfume ingredients employed therein.

Perfume-containing microcapsules of the present disclosure can be incorporated into water-soluble films of the type commonly employed in liquid detergent pouches or packets.

Polymer Film

The polymer component of the film according to the disclosure can be a water-soluble polymer resin. Suitable water-soluble polymer resins include polyvinyl alcohols.

Polyvinyl alcohol is a synthetic resin generally prepared by the alcoholysis, usually termed hydrolysis or saponification, of polyvinyl acetate. Fully hydrolyzed polyvinyl alcohol, where virtually all the acetate groups have been converted to alcohol groups, is a strongly hydrogen-bonded, highly crystalline polymer which dissolves only in hot water-greater than about 140° F. (about 60° C.). If a sufficient number of acetate groups are allowed to remain after the hydrolysis of polyvinyl acetate, that is the polyvinyl alcohol polymer is partially hydrolyzed, then the polymer is more weakly hydrogen-bonded, less crystalline, and is generally soluble in cold water—less than about 50° F. (about 10° C.). Both fully and partially hydrolyzed polyvinyl alcohol types are commonly referred to as polyvinyl alcohols or polyvinyl alcohol homopolymers, although the partially hydrolyzed polymer is technically a vinyl alcohol-vinyl acetate copolymer.

The term polyvinyl alcohol copolymer is generally used to describe polymers that can be derived by the hydrolysis of a copolymer of a vinyl ester, e.g. vinyl acetate, and another monomer. Polyvinyl alcohol copolymers can be tailored to desired film characteristics by varying the kind and quantity of copolymerized monomers. Examples of copolymerizations are those of vinyl acetate with a carboxylic acid or with an ester of a carboxylic acid. Again, if the hydrolysis of acetate groups in these copolymers is only partial, then the resulting polymer could be described as a polyvinyl alcohol terpolymer—having vinyl acetate, vinyl alcohol, and carboxylic acid groups—although it is commonly referred to as a polyvinyl alcohol copolymer.

As used herein, PVOH resins and PVOH-based films are intended to encompass fully and partially hydrolyzed polyvinyl alcohol homopolymers, and fully and partially hydrolyzed polyvinyl alcohol copolymers, and combinations thereof.

The polyvinyl alcohol resin in the films described herein will include a fully hydrolyzed polyvinyl alcohol, a partially hydrolyzed polyvinyl alcohol that is a vinyl alcohol-vinyl acetate copolymer, a fully hydrolyzed polyvinyl alcohol copolymer that includes an anionic monomer unit, a partially hydrolyzed polyvinyl alcohol copolymer that includes an anionic monomer unit, or any combination thereof. In various embodiments, the anionic monomer can be one or more of vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropane-sulfonic acid, 2-sufoethyl acrylate, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations thereof (e.g., multiple types of anionic monomers or equivalent forms of the same anionic monomer). For example, the anionic monomer can include one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid) and alkali metal salts thereof (e.g., sodium salts). Similarly, the anionic monomer can include one or more of monomethyl maleate and alkali metal salts thereof (e.g., sodium salts).

In one type of embodiment, the polyvinyl alcohol is a carboxyl group modified copolymer. In another aspect, the polyvinyl alcohol can be modified with a dicarboxyl type monomer. In one class of these embodiments, the α carbon of the carbonyl is contacted to the unsaturated bond (e.g., maleic acid, fumaric acid). In another class of these embodiments, the α carbon of the carbonyl is contacted to the unsaturated bond with a methyl branch (e.g., citraconic acid, mesaconic acid). In another class of these embodiments, the β carbon of the carbonyl is contacted to the unsaturated bond (e.g. itaconic acid, glutaconic acid cis, glutaconic acid trans). Monomers that provide alkyl carboxyl groups are contemplated. A maleate type (e.g., dialkyl maleate, including monomethyl maleate) comonomer is particularly contemplated.

The amount of inclusion of the anionic functional groups in the polyvinyl alcohol resin can be any suitable amount, for example in a range of 1 to 10 mole %, or 2 to 6%, for example, 2%, 3%, 4%, 5%, 6%, 7%, or 8%. In another aspect the number of pendant groups introduced by copolymerization can be in a range of 1% to 20%, or in a range of 2% to 12%, or 2% to 10%, or at least 2.5%, or at least 3%, or at least 3.5%, for example 2%, 3%, 6%, or 8%.

The total polyvinyl alcohol resin content of the film can have a degree of hydrolysis (D.H. or DH) of at least 80%, 84% or 85% and at most about 99.7%, 98%, 96%, 90%, or 80%, for example in a range of about 84% to about 90%, or 85% to 88%, or 86.5%, or in a range of 85% to 99.7%, about 88% to 98%, or 90% to 96%, for example 91%, 92%, 93%, 94%, 95%, or 96%. As used herein, the degree of hydrolysis is expressed as a mole percentage of vinyl acetate units converted to vinyl alcohol units.

The viscosity of a polyvinyl alcohol polymer (μ) is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. All viscosities specified herein in Centipoise (cP) should be understood to refer to the viscosity of 4% aqueous polyvinyl alcohol solution at 20° C., unless specified otherwise. Similarly, when a resin is described as having (or not having) a particular viscosity, unless specified otherwise, it is intended that the specified viscosity is the average viscosity for the resin, which inherently has a corresponding molecular weight distribution.

The polyvinyl alcohol resin can have any suitable molecular weight or viscosity, for example a viscosity average of at least about 10 cP, 12 cP, 13 cP, 13.5 cP, 14 cP, 15 cP, 16 cP, or 17 cP and at most about 30 cP, 28 cP, 27 cP, 26 cP, 24 cP, 22 cP, 20 cP, 19 cP, 18 cP, or 17.5 cP, for example in a range of about 10 cP to about 30 cP, or 13 cP to about 27 cP, or about 13.5 cP to about 20 cP, or about 18 cP to about 22 cP, or about 14 cP to about 19 cP, or about 16 cP to about 18 cP, or about 17 cP to about 16 cP, for example 23 cP, or 20 cP, or 16.5 cP. It is well known in the art that the viscosity of polyvinyl alcohol resins is correlated with the weight average molecular weight ($\overline{M}w$) of the polyvinyl alcohol resin, and often the viscosity is used as a proxy for the $\overline{M}w$. The weight average molecular weight of the water-soluble resin optionally can be in a range of about 35,000 to about 205,000, or about 80,000 to about 170,000, or about 97,000 to about 160,000 Daltons.

The molecular weight of the polymer resin need only be sufficient to enable it to be shaped or molded by suitable techniques to form a thin plastic film.

To be considered a water-soluble film according to the present disclosure, the film, at a thickness of about 1.5 mil (about 0.038 mm), dissolves in 300 seconds or less in water at a temperature of 20° C. (68° F.) in accordance with MonoSol Test Method MSTM-205, as described in U.S. Pat. No. 6,821,590.

Other Water Soluble Polymers

Other water soluble polymers suitable for use in the film in addition to the polyvinyl alcohol resin component can include, but are not limited to polyacrylates, water-soluble acrylate copolymers, polyvinyl pyrrolidone, polyethyleneimine, polyaminopropyl sulfonic acid and salts thereof, polyitaconic acid and salts thereof, polyvinyl pyrrolidone, pullulan, water-soluble natural polymers including, but not limited to, guar gum, gum Acacia, xanthan gum, carrageenan, and starch, water-soluble polymer derivatives including, but not limited to, modified starches, ethoxylated starch, and hydroxypropylated starch, copolymers of the forgoing and combinations of any of the foregoing with each other or other polymers, including polyvinyl alcohol. Yet other water-soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, poly (sodium acrylamido-2-methylpropane sulfonate), polymonomethylmaleate and salts thereof, copolymers thereof, and combinations of any of the foregoing with each other or other polymers, including polyvinyl alcohol. Such water-soluble polymers, whether polyvinyl alcohol or otherwise, are commercially available from a variety of sources.

Polymer Content

The film can include any suitable amount of polymer content; for example, for example an amount in a range of about 35 wt % to about 90 wt % based on the total weight of the film, or in a range of about 55 to about 95%, or about 60% to 90%, or about 65% to about 85%, or at least 50%.

Film Thickness

The film can have any suitable thickness, and a film thickness of about 76 microns (μm) is typical and particularly contemplated. Other values and ranges contemplated include values in a range of about 4 to about 400 μm, or about 5 to about 200 μm, or 20 to about 100 μm, or about 40 to about 90 μm, or about 50 to 80 μm, or about 60 to 65 μm, for example 65 μm, 76 μm, or 80 μm, or 88 μm, or 95 μm.

As described in connection with Examples 4 and 5 below, inclusion of microcapsules in a water-soluble film (e.g. a PVOH or PVOH copolymer film) may affect some mechanical properties, e.g. by reducing tear strength. To some extent, increasing the film thickness can compensate for the difference in mechanical properties. There is also a beneficial effect on dissolution and disintegration times for water-soluble films (Example 5), which can compensate to some extent for the increased film thickness.

Plasticizers

As mentioned above, the film can include a plasticizer with the polymer resin. For PVOH-based films (including PVOH copolymers) as well as others, the plasticizer can include, but is not limited to, glycerin, diglycerin, sorbitol, ethylene glycol, diethylene glycol, triethylene glycol, dipropylene glycol, tetraethylene glycol, propylene glycol, polyethylene glycols up to 400 MW (e.g., PEG200, PEG400), hexylene glycol, neopentyl glycol, trimethylolpropane, polyether polyols (e.g. VORANOL 660), polyether diol, polyether triol, sorbitol, xylitol, 2-methyl-1,3-propanediol (e.g. MP Diol®), ethanolamines, and combinations thereof. It known that residual water content in a polyvinyl alcohol film can also function as a plasticizer. The total amount of the plasticizer in a film can generally be in a range of about 10 wt. % to about 45 wt. %, or about 20 wt. % to about 45 wt. %, or about 15 wt. % to about 35 wt. %, or about 20 wt. % to about 30 wt. %, for example about 25 wt. %, based on total film weight. As the amount of microcapsules in the film is increased, the amount of resin in the film is relatively less and thus the amount of plasticizer in the total weight of the film should be relatively less. Thus, it is contemplated that the total amount of the plasticizer in the film can optionally be in a range of about 10 wt. % to about 40 wt. %, or about 10 wt. % to about 35 wt %, or about 10 wt. % to about 30 wt. %, or about 10 wt. % to about 25 wt. %, or about 10 wt. % to about 20 wt. %, for example.

Microcapsule Size

It has been found that in the films described herein (e.g. Example 1 below) the microcapsule size has an effect on the olfactory performance, and thus fragrance delivery independent of fragrance content of the film. For example, when the microcapsules are too small, they do not adhere to or remain embedded or otherwise associated with textiles to a sufficient degree, they do not release additives at a desired rate, nor do they easily rupture. When the microcapsules are too large, they are less stable, can burst prematurely, and can disrupt the film polymer matrix to a higher degree, diminishing film mechanical properties to a point where conversion of film into containers can become more difficult or impossible.

Thus, in certain aspects, the microcapsules can have a size of at least 12 µm, or at least 12.4 µm, or at least 13 µm, or at least 14 µm, or at least 15 µm or at least 16 µm, or at least 16.7 µm, or at least 17 µm, or at least 20 µm, or at least 20.6 µm. The microcapsule sizes just described can be the median (d50) particle size in one type of embodiment.

In certain types of embodiments, the microcapsules will have a particle size less than the film thickness, and preferably significantly less than the film thickness, for example less than half the film thickness. The microcapsule sizes just described can be the median (d50) particle size in one type of embodiment.

Microcapsule Loading

The microcapsules can be included in the film in any concentration desired. It has been found that in the films described herein (e.g. Example 3 below) the microcapsule loading has an effect on the olfactory performance using microcapsules containing perfume oil as their additive contents. Thus, in certain aspects, the films can have a perfume microcapsule loading of at least 3 wt. %, 6 wt. %, 9 wt. %, or at least 10 wt. %, or at least 11 wt. %, or at least 12 wt. %, or more, to yield a significant benefit in olfactory performance. For example, these perfume microcapsule loadings can be used in films having a thickness of at least 76 µm, or in a range of about 50 µm to 100 µm, and further optionally in packets comprising 25 cm² to about 50 cm² of the perfume microcapsule-containing film described herein. It was also found that microcapsules can affect some film mechanical properties, e.g. reducing tear strength to a greater extent with increasing microcapsule concentration.

Accordingly, in certain embodiments the films can have a microcapsule loading of less than 50 wt. %, or less than 40 wt. %, or less than 33 wt. %, or less than 30 wt. %, or less than 25 wt. %, or less than 20 wt. %, or less than 18 wt. %, or less than 15 wt. %, or less than 12 wt. %, or less than 9 wt. %, or less than 6 wt. %, or less than 3 wt. %, for example.

Microcapsule Contents

The microcapsules of the films described herein can have any desired content that is suitably compatible with the microcapsule shell material and their methods of manufacture. Fragrances, including perfume oils are contemplated as an additive for use as microcapsule contents.

There is no particular limitation as to the nature of the perfumery ingredients that may be encapsulated, and suitable perfumery ingredients are listed in reference texts such as the book by S. Arctander, Perfume and Flavor Chemicals, 1969, Montclair, N.J., USA, or its more recent versions, or in other works of a similar nature, such as thegoodscentcompany.com and leffingwell.com websites, as well as in the abundant patent literature in the field of perfumery.

Other Film Ingredients

The film (e.g. a water-soluble film) can contain other auxiliary agents and processing agents, such as, but not limited to, plasticizer compatibilizers, surfactants, lubricants, release agents, emulsifiers, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. The amount of such agents can be up to about 50 wt. %, 20 wt %, 15 wt %, 10 wt %, 5 wt. %, 4 wt % and/or at least 0.01 wt. %, 0.1 wt %, 1 wt %, or 5 wt %, individually or collectively, for example.

Surfactants for use in water-soluble films are well known in the art. Optionally, surfactants are included to aid in the dispersion of the resin solution upon casting. Suitable surfactants for water-soluble films of the present disclosure include, but are not limited to, dialkyl sulfosuccinates, lactylated fatty acid esters of glycerol and propylene glycol, lactylic esters of fatty acids, sodium alkyl sulfates, polysorbate 20, polysorbate 60, polysorbate 65, polysorbate 80, alkyl polyethylene glycol ethers, lecithin, acetylated fatty acid esters of glycerol and propylene glycol, sodium lauryl sulfate, acetylated esters of fatty acids, myristyl dimethylamine oxide, trimethyl tallow alkyl ammonium chloride, quaternary ammonium compounds, salts thereof and combinations of any of the foregoing.

One type of secondary component contemplated for use is a defoamer. Defoamers can aid in coalescing of foam bubbles. Suitable defoamers for use in water-soluble films according to the present disclosure include, but are not limited to, hydrophobic silicas, for example silicon dioxide or fumed silica in fine particle sizes, including FOAM BLAST defoamers available from Emerald Performance Materials.

Method of Making Films

The film can be made by any suitable method. Processes for making water-soluble films and pouches, include casting, blow-molding, extrusion and blown extrusion, as known in the art. As mentioned above, in one aspect the disclosure relates to the manufacture of water-soluble films, particularly films of polyvinyl alcohol, and particularly to solvent cast films. Processes for solvent casting of polyvinyl alcohol are well-known in the art. For example, in the film-forming process, the polyvinyl alcohol resin(s) and secondary additives are dissolved in a solvent, typically water, metered onto a surface, allowed to substantially dry (or force-dried) to form a cast film, and then the resulting cast film is removed from the casting surface. The process can be performed batchwise, and is more efficiently performed in a continuous process.

In the formation of continuous films of polyvinyl alcohol, it is the conventional practice to meter a solution of the solution onto a moving casting surface, for example, a continuously moving metal drum or belt, causing the solvent to be substantially removed from the liquid, whereby a self-supporting cast film is formed, and then stripping the resulting cast film from the casting surface.

For the films described herein, the microcapsules can be added to the other film ingredients at any time in the manufacturing process. In one type of embodiment, the microcapsules are added after any steps involving elevated heating (e.g. above about 65° C.) of the base polymer and any other ingredients. In another type of embodiment, the microcapsules are added after the polymer resins and plasticizers have been mixed, and further optionally following a degassing step. For example, a polyvinyl alcohol resin can be mixed with water for dissolution, and with plasticizers and other secondary additives, the solution can be heated (e.g. boiled) and then let stand to degas, and finally the microcapsules can be added with slow mixing until homogenous, prior to casting the solution to create a film. In such a process, the microcapsules are mixed with the polymer formulation in way that avoids introduction of air into the mixture, to avoid creation of bubbles and thus pinholes in the final film. Those skilled in the art will recognize that different mixing blade configurations can be chosen to help maximize mixing while avoiding air entrainment into the solution. For example, the solution can be stirred at a speed that avoids creation of a vortex, for example 300 RPM or less, or 200 RPM or less in certain embodiments. In an alternative process, the α polyvinyl alcohol resin can be mixed with water for dissolution, and with plasticizers and other secondary additives, the solution can be boiled and then let stand to degas, and finally the microcapsules can be continuously blended into to a continuous stream of polymer upstream of a film making step (e.g., just before casting). To better ensure homogeneity, the film-forming composition containing the microcapsules can be subjected to an inline mixing operation, e.g. by use of a static mixer. In one type of embodiment, the mixing is by flow division; in another type of embodiment the mixing is by radial mixing; another type of embodiment employs both flow division and radial mixing. One type of inline mixer that can be used is a plate-type mixer; another type is a helical mixer.

Optionally, the water-soluble film can be a free-standing film consisting of one layer or a plurality of like layers.

In one aspect, the film can be thermoformable. Thus, the film can be a thermoformed film, in the sense that the film undergoes a thermoforming step, shaping the film through application of heat and force, after initial film formation.

In certain thermoforming operations, the film can be thinned by as much as 67%, for example. In embodiments wherein the film is a thermoformed film, then it is contemplated that the microcapsules can have a size which is less than the thinned film gauge following thermoforming. For example, for a film that is 76 μm upon initial manufacture by casting, and then thermoformed such that some regions of the film have a thickness as little as 27 μm, then preferably the perfume-containing microcapsules (or a significant portion of the distribution) will be less than 27 μm in size.

Thus, in one type of embodiment, the perfume-containing microcapsules are characterized by a d50 particle size less than 33% of the film thickness. In another type of embodiment, the perfume-containing microcapsules are characterized by a d90 particle size less than 33% of the film thickness.

Packets

Water-soluble film embodiments are useful for creating a packet to contain a detergent composition comprising cleaning actives thereby forming a pouch. The cleaning actives may take any form such as powders, granulates, gels, mulls, pastes, liquids, tablets or any combination thereof. Water-soluble film embodiments are also useful for any other application in which improved wet handling and low cold water residues are desired. The film can form at least one side wall of the pouch and/or packet, optionally the entire pouch and/or packet, and optionally an outer surface of the at least one sidewall. In another type of embodiment, the film forms an inner wall of the packet, e.g. as a dividing wall between compartments.

The film described herein (e.g. a water-soluble film embodiment) can also be used to make a packet with two or more compartments made of the same film or in combination with films of other polymeric materials. Additional films can, for example, be obtained by casting, blow-molding, extrusion or blown extrusion of the same or a different polymeric material, as known in the art. In one type of embodiment, the polymers, copolymers or derivatives thereof suitable for use as the additional film are selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. One contemplated class of embodiments is characterized by the level of polymer in the packet material, for example the polyvinyl alcohol copolymer described above, as described above, being at least 60%.

The pouches of the present disclosure can include at least one sealed compartment. Thus, the pouches may comprise a single compartment or multiple compartments. A water-soluble pouch can be formed from two layers of water-soluble polymer film sealed at an interface, or by a single film that is folded upon itself and sealed. One or both of the films include microcapsules as described herein, and one or both of the films can be a polyvinyl alcohol film described herein. The films define an interior pouch container volume which contains any desired composition for release into an aqueous environment. The composition is not particularly limited, for example including any of the variety of cleaning compositions described below. In embodiments comprising multiple compartments, each compartment may contain identical and/or different compositions. In turn, the compositions may take any suitable form including, but not limited to liquid, solid and combinations thereof (e.g. a solid suspended in a liquid). In some embodiments, the pouches comprises a first, second and third compartment, each of which respectively contains a different first, second, and third composition. Liquid detergents are particularly contemplated.

The compartments of multi-compartment pouches may be of the same or different size(s) and/or volume(s). The compartments of the present multi-compartment pouches can be separate or conjoined in any suitable manner. In some embodiments, the second and/or third and/or subsequent compartments are superimposed on the first compartment. In one embodiment, the third compartment may be superimposed on the second compartment, which is in turn superimposed on the first compartment in a sandwich configuration. Alternatively the second and third compartments may be superimposed on the first compartment. However it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, for example, so as to pre-treat or post-treat a fabric with a composition from a compartment. In some embodiments, the first compartment may be surrounded by at least the second compartment, for example in a tire-and-rim configuration, or in a pouch-in-a-pouch configuration.

In some embodiments, multi-compartment pouches comprise three compartments consisting of a large first compartment and two smaller compartments. The second and third smaller compartments are superimposed on the first larger compartment. The size and geometry of the compartments are chosen such that this arrangement is achievable. The geometry of the compartments may be the same or different. In some embodiments the second and optionally third compartment each has a different geometry and shape as compared to the first compartment. In these embodiments, the second and optionally third compartments are arranged in a design on the first compartment. The design may be decorative, educative, or illustrative, for example to illustrate a concept or instruction, and/or used to indicate origin of the product. In some embodiments, the first compartment is the largest compartment having two large faces sealed around the perimeter, and the second compartment is smaller covering less than about 75%, or less than about 50% of the surface area of one face of the first compartment. In embodiments in which there is a third compartment, the aforementioned structure may be the same but the second and third compartments cover less than about 60%, or less than about 50%, or less than about 45% of the surface area of one face of the first compartment.

The pouches and/or packets of the present disclosure may comprise one or more different films, wherein at least one film is the microcapsule-containing PVOH film described herein. For example, in single compartment embodiments, the packet may be made from one wall that is folded onto itself and sealed at the edges, or alternatively, two walls that are sealed together at the edges. In multiple compartment embodiments, the packet may be made from one or more films such that any given packet compartment may comprise walls made from a single film or multiple films having differing compositions. In one embodiment, a multi-compartment pouch comprises at least three walls: an outer upper wall; an outer lower wall; and a partitioning wall, wherein at least one of the at least three walls comprises the microcapsule-containing PVOH film described herein. The outer upper wall and the outer lower wall are generally opposing and form the exterior of the pouch. The partitioning wall is interior to the pouch and is secured to the generally opposing outer walls along a seal line. The partitioning wall separates the interior of the multi-compartment pouch into at least a first compartment and a second compartment.

As described in connection with Example 4 below, inclusion of perfume-containing microcapsules in the microcapsule-containing film can affect some mechanical properties, e.g. by reducing tear strength. Significantly higher loading of perfume-containing microcapsules can be achieved if the microcapsule-containing film (e.g. a PVOH film) is not intended for maintaining structural and mechanical strength, e.g. when used as primary packaging. Accordingly, in one type of embodiment the microcapsule-containing film is not used as an outer wall of a container (e.g. outer upper wall or outer lower wall). For example, the microcapsule-containing film can be used as a partitioning wall in a multi-compartment pouch. Further, in embodiments such a microcapsule-containing film can either have a higher concentration of perfume-containing microcapsules compared to a microcapsule-containing film that would be used as an outer wall of a primary package, or the film can be thicker than a comparative water-soluble film used as an outer wall of a primary package. For example, a microcapsule-containing water-soluble (e.g. polyvinyl alcohol-based) film used as a partitioning wall in a multi-compartment pouch can have a perfume-containing microcapsule concentration of 3 wt. % to 20 wt. % and/or a thickness of greater than 76 µm or greater than 88 µm, for example in a range 90 to 250 µm, or 90 to 150 µm, or 90 to 125 µm, or 90 to 100 µm.

An additional benefit can be derived from using the microcapsule-containing film as a partitioning wall, in that the perfume-containing microcapsules have a very low permeability such that the film can help to minimize migration of components between pouch chambers.

Pouches and/or packets may be made using any suitable equipment and method. For example, single compartment pouches may be made using vertical form filling, horizontal form filling, or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds, in which packets may be made, can have any shape, length, width and depth, depending on the required dimensions of the pouches. The molds may also vary in size and shape from one to another, if desirable. For example, the volume of the final pouches may be about 5 ml to about 300 ml, or about 10 to 150 ml, or about 20 to about 100 ml, about 5 ml to about 35 ml, or about 10 to 25 ml, and the mold sizes are adjusted accordingly.

In one embodiment, the packet comprises a first and a second sealed compartment. The second compartment is in a generally superposed relationship with the first sealed compartment such that the second sealed compartment and the first sealed compartment share a partitioning wall interior to the pouch.

In one embodiment, the packet comprising a first and a second compartment further comprises a third sealed compartment. The third sealed compartment is in a generally superposed relationship with the first sealed compartment such that the third sealed compartment and the first sealed compartment share a partitioning wall interior to the pouch.

In some embodiments, the first composition and the second composition are selected from one of the following combinations: liquid, liquid; liquid, powder; powder, powder; and powder, liquid.

In some embodiments, the first, second and third compositions are selected from one of the following combinations: solid, liquid, liquid; liquid, liquid, liquid. In other embodiments each of the first, second, and third compositions can be independently selected from any one or more of (solid, liquid, gel, paste, mull, powder).

In one embodiment, the single compartment or plurality of sealed compartments contains a composition. The plurality of sealed compartments may each contain the same or a different composition. The composition is selected from a liquid, solid, paste, gel, mull, or combination thereof.

In one embodiment, the composition may be selected from the group of liquid heavy duty liquid detergent compositions, powdered detergent compositions, fabric enhancers, and detergent gels commonly used for laundry.

Shaping, Sealing, and Thermoforming

As mentioned above, the film described herein is thermoformable. A thermoformable film is one that can be shaped through the application of heat and a force.

Thermoforming a film is the process of heating the film, shaping it (e.g. in a mold), and then allowing the film to cool, whereupon the film will hold its shape, e.g. the shape of the mold. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. In some embodiments, the film is heated using an infrared light. The film may be heated to a temperature in a range of about 50 to about 150° C., about 50 to about 120° C., about 60 to about 130° C., about 70 to about 120° C., or about 60 to about 90° C. Thermoforming can be performed by any one or more of the following processes: the manual draping of a thermally softened film over a mold, or the pressure induced shaping of a softened film to a mold (e.g., vacuum forming), or the automatic high-speed indexing of a freshly extruded sheet having an accurately known temperature into a forming and trimming station, or the automatic placement, plug and/or pneumatic stretching and pressuring forming of a film.

Alternatively or in addition, the film can be wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film.

Once a film has been heated and/or wetted, it may be drawn into an appropriate mold, preferably using a vacuum. The film can be thermoformed with a draw ratio of at least about 1.5, for example, and optionally up to a draw ratio of 2, for example. The filling of the molded film can be accomplished by utilizing any suitable means. In some embodiments, the most preferred method will depend on the product form and desired speed of filling. In some embodiments, the molded film is filled by in-line filling techniques. The filled, open packets are then closed, forming the pouches, using a second film, by any suitable method. This may be accomplished while in horizontal position and in continuous, constant motion. The closing may be accomplished by continuously feeding a second film, preferably water-soluble film, over and onto the open packets and then preferably sealing the first and second film together, typically in the area between the molds and thus between the packets.

Any suitable method of sealing the packet and/or the individual compartments thereof may be utilized. Non-limiting examples of such means include heat sealing, solvent welding, solvent or wet sealing, and combinations thereof. Typically, only the area of the packet which is to form the seal is treated with heat or solvent. The heat or solvent can be applied by any method, typically on the closing material, and typically only on the areas of the closing material which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing onto the areas between the molds, and then applying pressure onto these areas, to form the seal. Sealing rolls and belts (optionally also providing heat) can be used, for example as described in U.S. Pat. No. 7,127,874.

The formed pouches may then be separated from each other by a cutting device. Cutting can be accomplished using any known method. It may be preferred that the cutting is also done in continuous manner, and preferably with constant speed and optionally while in horizontal position. The cutting device can, for example, be a sharp item, or a hot item, or a laser, whereby in the latter cases, the hot item or laser 'burns' through the film/sealing area of the pouch.

The different compartments of a multi-compartment pouches may be made together in a side-by-side style wherein the resulting, conjoined pouches may or may not be separated by cutting. Alternatively, the compartments can be made separately.

In some embodiments, pouches may be made according to a process comprising the steps of: a) forming a first compartment (as described above); b) forming a recess within some or all of the closed compartment formed in step (a), to generate a second molded compartment superposed above the first compartment; c) filling and closing the second compartments by means of a third film; d) sealing the first, second and third films; and e) cutting the films to produce a multi-compartment pouch, wherein at least one of the first, second or third films are the microcapsule-containing PVOH film described herein. The recess formed in step (b) may be achieved by applying a vacuum to the compartment prepared in step (a).

In some embodiments, second, and/or third compartment(s) can be made in a separate step and then combined with the first compartment as described in U.S. Patent Application Publication Number 2014/345064 A1 or U.S. Pat. No. 7,964,549.

In some embodiments, pouches may be made according to a process comprising the steps of: a) forming a first compartment, optionally using heat and/or vacuum, using a first film on a first forming machine; b) filling the first compartment with a first composition; c) on a second forming machine, deforming a second film, optionally using heat and vacuum, to make a second and optionally third molded compartment; d) filling the second and optionally third compartments; e) sealing the second and optionally third compartment using a third film, wherein at least one of the first film, the second film or the third film comprises the microcapsule-containing PVOH film described herein; f) placing the sealed second and optionally third compartments onto the first compartment; g) sealing the first, second and optionally third compartments; and h) cutting the films to produce a multi-compartment pouch.

The first and second forming machines may be selected based on their suitability to perform the above process. In some embodiments, the first forming machine is preferably a horizontal forming machine, and the second forming machine is preferably a rotary drum forming machine, preferably located above the first forming machine.

It should be understood that by the use of appropriate feed stations, it may be possible to manufacture multi-compartment pouches incorporating a number of different or distinctive compositions and/or different or distinctive powder, liquid, gel or paste compositions.

In some embodiments, the film and/or pouch is sprayed or dusted with a suitable material, such as an active agent, a lubricant, an aversive agent, or mixtures thereof. In some embodiments, the film and/or pouch is printed upon, for example, with an ink and/or an active agent.

Although the film has been described hereinabove with reference to it being formed into 3-dimensional forms, such as pouches or packets, and the like, the skilled person will appreciate that the film may be presented in other forms. For example, water-soluble films are described in U.S. Patent Application Publication No. 2007/0269651 A1. Disclosed therein are thin films that are characterized by linear dimensions of about 0.2 to about 100 mm, more particularly 0.5 to about 50 mm, and still more particularly about 1 to about 20 mm. These films may be cut or prepared into "confetti" of various geometric shapes that is added to a detergent composition. These films may also be cut into shapes resembling flowers, flower petals or leaves. Still further, the films may be provided in the form of a strip on a roll, which can be dispensed like a tape, with perforations to allow ease of separation of segments. All of these means of presenting film are incorporated by reference into the present disclosure.

Whatever form the film takes, in one particular type of embodiment of the present disclosure the film has a surface area of 25 to 75 cm$^2$, and more particularly 30 to 50 cm$^2$. In one type of embodiment, the film can have a surface area of 25 to 75 cm$^2$, and more particularly 30 to 50 cm$^2$, after thermoforming.

In embodiments, the film can have a density in a range of 0.005 to 0.03 g/cm$^2$, and more particularly 0.008 to 0.025 g/cm$^2$.

In an embodiment of the present invention, the film is formed or shaped as a pouch or capsule, having describing cavity containing 35 ml or less of detergent composition.

Pouch Contents

The present articles (e.g., in the form of pouches or packets) comprising the microcapsule-containing film described herein may contain various compositions, for example household care compositions. A multi-compartment pouch may contain the same or different compositions in each separate compartment. The composition is proximal to the water-soluble film. The composition may be less than about 10 cm, or less than about 5 cm, or less than about 1 cm from the film. Typically the composition is adjacent to the film or in contact with the film. The microcapsule-containing film may be in the form of a pouch or a compartment, containing the composition therein.

The film and pouch are particularly advantageous for packaging (e.g., in direct contact with) materials which have exchangeable hydrogen ions, for example compositions characterized by acid/base equilibria, such as amine-fatty acid equilibria and/or amine-anionic surfactant acid equilibria.

Multi-compartment pouches may be utilized to keep compositions containing incompatible ingredients (e.g., bleach and enzymes) physically separated or partitioned from each other. It is believed that such partitioning may expand the useful life and/or decrease physical instability of such ingredients. Additionally or alternatively, such partitioning may provide aesthetic benefits as described in U.S. Patent Application Publication No. 2010/0305020 A1.

Non-limiting examples of useful compositions (e.g., household care compositions) include light duty and heavy duty liquid detergent compositions, hard surface cleaning compositions, detergent gels commonly used for laundry, bleach and laundry additives, fabric enhancer compositions (such as fabric softeners), shampoos, body washes, and other personal care compositions. Compositions of use in the present pouches may take the form of a liquid, solid or a powder. Liquid compositions may comprise a solid. Solids may include powder or agglomerates, such as micro-capsules, beads, noodles or one or more pearlized balls or mixtures thereof. Such a solid element may provide a technical benefit, through the wash or as a pre-treat, delayed or sequential release component; additionally or alternatively, it may provide an aesthetic effect.

The compositions contained by the pouches, packets, and films described herein can have any suitable viscosity depending on factors such as formulated ingredients and purpose of the composition. In one embodiment, the composition has a high shear viscosity value, at a shear rate of 20 s$^{-1}$ and a temperature of 20° C., of 100 to 3,000 cP, alternatively 300 to 2,000 cP, alternatively 500 to 1,000 cP, and a low shear viscosity value, at a shear rate of 1 s$^{-1}$ and a temperature of 20° C., of 500 to 100,000 cP, alternatively 1000 to 10,000 cP, alternatively 1,300 to 5,000 cP. Methods to measure viscosity are known in the art. According to the present invention viscosity measurements are carried out using a rotational rheometer e.g. TA instruments AR550. The instrument includes a 40 mm 2° or 1° cone fixture with a gap of around 50-60 μm for isotropic liquids, or a 40 mm flat steel plate with a gap of 1000 μm for particles containing liquids. The measurement is carried out using a flow procedure that contains a conditioning step, a peak hold and a continuous ramp step. The conditioning step involves the setting of the measurement temperature at 20° C., a pre-shear of 10 seconds at a shear rate of 10 s$^{-1}$, and an equilibration of 60 seconds at the selected temperature. The peak hold involves applying a shear rate of 0.05 s$^{-1}$ at 20° C. for 3 min with sampling every 10 s. The continuous ramp step is performed at a shear rate from 0.1 to 1200 s$^-$ for 3 min at 20° C. to obtain the full flow profile.

The types of detergent composition employed in the present invention can be those typically employed in compact formulae product formats, such as unit dose pouches and capsules as referred to hereinabove.

Detergent compositions suitable in these product formats, and suitable for use in the present invention can include 20 wt % or less of water, more particularly 10 wt % or less of water, and up to 75 wt % or more of surfactants, such as anionic and non-ionic surfactants. Detergent compositions are described in U.S. Patent Application Publication No. 2009/0298739 A1, EP 507402 and U.S. Pat. No. 6,660,708, all of which are hereby incorporated by reference.

In pouches comprising laundry, laundry additive and/or fabric enhancer compositions, the compositions may comprise one or more of the following non-limiting list of ingredients: fabric care benefit agent; detersive enzyme; deposition aid; rheology modifier; builder; bleach; bleaching agent; bleach precursor; bleach booster; bleach catalyst; perfume and/or perfume microcapsules (see for example U.S. Pat. No. 5,137,646); perfume loaded zeolite; starch encapsulated accord; polyglycerol esters; whitening agent; pearlescent agent; enzyme stabilizing systems; scavenging agents including fixing agents for anionic dyes, complexing agents for anionic surfactants, and mixtures thereof; optical brighteners or fluorescers; polymer including but not limited to soil release polymer and/or soil suspension polymer; dispersants; antifoam agents; non-aqueous solvent; fatty acid; suds suppressors, e.g., silicone suds suppressors (see: U.S. Publication No. 2003/0060390 A1, ¶65-77); cationic starches (see: US 2004/0204337 A1 and US 2007/0219111 A1); scum dispersants (see: US 2003/0126282 A1, ¶89-90); substantive dyes; hueing dyes (see: US 2014/0162929A1); colorants; opacifier; antioxidant; hydrotropes such as toluenesulfonates, cumenesulfonates and naphthalenesulfonates; color speckles; colored beads, spheres or extrudates; clay softening agents; anti-bacterial agents. Any one or more of these ingredients is further described in described in European Patent Application Number 09161692.0, U.S. Publication Number 2003/0139312A1 and U.S. Pat. No. 8,288,332. Additionally or alternatively, the compositions may comprise surfactants, quaternary ammonium compounds, and/or solvent systems. Quaternary ammonium compounds may be present in fabric enhancer compositions, such as fabric softeners, and comprise quaternary ammonium cations that are positively charged polyatomic ions of the structure $NR_4^+$, where R is an alkyl group or an aryl group.

Surfactants

The detergent compositions can comprise from about 1% to 80% by weight of a surfactant. Surfactant is particularly preferred as a component of the first composition. Preferably, the first composition comprises from about 5% to 50% by weight of surfactant. If present, the second and third compositions may comprise surfactant at levels of from 0.1 to 99.9%.

Detersive surfactants utilized can be of the anionic, nonionic, zwitterionic, ampholytic or cationic type or can comprise compatible mixtures of these types. More preferably surfactants are selected from the group consisting of anionic, nonionic, cationic surfactants and mixtures thereof. Preferably the compositions are substantially free of betaine surfactants. Detergent surfactants useful herein are described in U.S. Pat. Nos. 3,664,961; 3,919,678; 4,222,905; and 4,239,659. Anionic and nonionic surfactants are preferred.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkyl ammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Additional non-soap anionic surfactants which are suitable for use herein include the water-soluble salts, preferably the alkali metal, and ammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants include: a) the sodium, potassium and ammonium alkyl sulfates, especially those obtained by sulfating the higher alcohols ($C_8$-$C_{18}$) such as those produced by reducing the glycerides of tallow or coconut oil; b) the sodium, potassium and ammonium alkyl polyethoxylate sulfates, particularly those in which the alkyl group contains from 10 to 22, preferably from 12 to 18 carbon atoms, and wherein the polyethoxylate chain contains from 1 to 15, preferably 1 to 6 ethoxylate moieties; and c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11}$-$C_{13}$ LAS.

Preferred nonionic surfactants are those of the formula $R_1(OC_2H_4)_nOH$, wherein $R_1$ is a $C_{10}$-$C_{16}$ alkyl group or a $C_8$-$C_{12}$ alkyl phenyl group, and n is from 3 to about 80. Particularly preferred are condensation products of $C_{12}$-$C_{15}$ alcohols with from about 5 to about 20 moles of ethylene oxide per mole of alcohol, e.g., $C_{12}$-$C_{13}$ alcohol condensed with about 6.5 moles of ethylene oxide per mole of alcohol.

Solvent System

The solvent system in the present compositions can be a solvent system containing water alone or mixtures of organic solvents with water. Preferred organic solvents include 1,2-propanediol, ethanol, glycerol, dipropylene glycol, 2-methyl-1,3-propanediol and mixtures thereof. Other lower alcohols, $C_1$-$C_4$ alkanolamines such as monoethanolamine and triethanolamine, can also be used. Solvent systems can be absent, for example from anhydrous solid embodiments of the disclosure, but more typically are present at levels in the range of from about 0.1% to about 98%, preferably at least about 1% to about 50%, more usually from about 5% to about 25%. Typically, the present compositions, particularly when in liquid form, comprise less than 50% water, preferably from about 0.1% to about 20% water, or more preferably from about 0.5% to about 15%, or from about 5% to about 12%, by weight of the composition, of water.

The compositions herein can generally be prepared by mixing the ingredients together. If a pearlescent material is used it should be added in the late stages of mixing. If a rheology modifier is used, it is preferred to first form a pre-mix within which the rheology modifier is dispersed in a portion of the water and optionally other ingredients eventually used to comprise the compositions. This pre-mix is formed in such a way that it forms a structured liquid. To this structured pre-mix can then be added, while the pre-mix is under agitation, the surfactant(s) and essential laundry adjunct materials, along with water and whatever optional detergent composition adjuncts are to be used.

The pH of the useful compositions may be from about 2 to about 12, about 4 to about 12, about 5.5 to about 9.5, about 6 to about 8.5, or about 6.5 to about 8.2. Laundry detergent compositions may have a pH of about 6 to about 10, about 6.5 to about 8.5, about 7 to about 7.5, or about 8 to about 10. Laundry detergent additive compositions may have a pH of about 4 to about 8. Fabric enhancers may have a pH of from about 2 or 4 to about 8, or from about 2 to about 4, or from about 2.5 to about 3.5, or from about 2.7 to about 3.3.

The pH of the detergent is defined as the pH of an aqueous 10% (weight/volume) solution of the detergent at 20±2° C.; for solids and powdered detergent this is defined as the pH of an aqueous 1% (weight/volume) solution of the detergent at 20±2° C. Any meter capable of measuring pH to ±0.01 pH units is suitable. Orion meters (Thermo Scientific, Clintinpark-Keppekouter, Ninovesteenweg 198, 9320 Erembodegem-Aalst, Belgium) or equivalent are acceptable instruments. The pH meter should be equipped with a suitable glass electrode with calomel or silver/silver chloride reference. An example includes Mettler DB 115. The electrode shall be stored in the manufacturer's recommended electrolyte solution.

The 10% aqueous solution of the detergent is prepared according to the following procedure. A sample of 10±0.05 grams is weighted with a balance capable of accurately measuring to ±0.02 grams. The sample is transferred to a 100 mL volumetric flask, diluted to volume with purified water (deionized and/or distilled water are suitable as long as the conductivity of the water is <5 μS/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

For solid and powdered detergents, the 1% aqueous solution of the detergent is prepared according to the following procedure. A sample of 10±0.05 grams is weighted with a balance capable of accurately measuring to ±0.02 grams. The sample is transferred to a volumetric flask of 1000 mL, diluted to volume with purified water (deionized and/or distilled water are suitable as long as the conductivity of the water is <5 μS/cm), and thoroughly mixed. About 50 mL of the resulting solution is poured into a beaker, the temperature is adjusted to 20±2° C. and the pH is measured according to the standard procedure of the pH meter manufacturer (it is critical to follow the manufacturer's instructions to also set up and calibrate the pH assembly).

Bleaches

Inorganic and organic bleaches are suitable cleaning actives for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated as is known in the art.

Alkali metal percarbonates, particularly sodium percarbonate are preferred perhydrates for use in the detergent composition described herein. The percarbonate is most preferably incorporated into the products in a coated form which provides in-product stability. A suitable coating material providing in product stability comprises mixed salt of a water-soluble alkali metal sulphate and carbonate. Such coatings together with coating processes have previously been described in GB1,466,799, and U.S. Pat. Nos. 3,975,280; 4,075,116; and 5,340,496, each incorporated herein by reference. The weight ratio of the mixed salt coating material to percarbonate lies in the range from 1:99 to 1:9, and preferably from 1:49 to 1:19. Preferably, the mixed salt is of sodium sulphate and sodium carbonate which has the general formula $Na_2SO_4 \cdot n \cdot Na_2CO_3$ wherein n is from 0.1 to 3, preferably from 0.3 to 1.0, and more preferably from 0.2 to 0.5. Another suitable coating material providing in product stability comprises sodium silicate of $SiO_2$: $Na_2O$ ratio from 1.8:1 to 3.0:1, preferably 1.8:1 to 2.4:1, and/or sodium metasilicate, preferably applied at a level of from 2% to 10%, (normally from 3% to 5%) of $SiO_2$ by weight of the inorganic perhydrate salt, such as potassium peroxymonopersulfate. Other coatings which contain magnesium silicate, silicate and borate salts, silicate and boric acids, waxes, oils, and fatty soaps can also be used advantageously Organic bleaches can include organic peroxyacids including diacyl and tetraacylperoxides, especially diperoxydodecanedioc acid, diperoxytetradecanedioc acid, and diperoxyhexadecanedioc acid. Dibenzoyl peroxide is a preferred organic peroxyacid herein. The diacyl peroxide, especially dibenzoyl peroxide, preferably can be present in the form of particles having a weight average diameter of from about 0.1 to about 100 microns, preferably from about 0.5 to about 30 microns, more preferably from about 1 to about 10 microns. Preferably, at least about 25% to 100%, more preferably at least about 50%, even more preferably at least about 75%, most preferably at least about 90%, of the particles are smaller than 10 microns, preferably smaller than 6 microns.

Other organic bleaches include the peroxy acids, particular examples being the alkylperoxy acids and the arylperoxy acids. Preferred representatives are: (a) peroxybenzoic acid and its ring-substituted derivatives, such as alkylperoxybenzoic acids, but also peroxy-α-naphthoic acid and magnesium monoperphthalate; (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates; and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi(6-aminopercaproic acid)

Bleach activators can include organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 10 carbon atoms, in particular from 2 to 4 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC).

Bleach catalysts preferred for use in the detergent composition herein include the manganese triazacyclononane and related complexes (U.S. Pat. Nos. 4,246,612, 5,227,084); Co, Cu, Mn and Fe bispyridylamine and related complexes (U.S. Pat. No. 5,114,611); and pentamine acetate cobalt(III) and related complexes (U.S. Pat. No. 4,810,410).

A complete description of bleach catalysts suitable for use herein can be found in U.S. Pat. No. 6,599,871, incorporated herein by reference.

The microcapsules described herein can interact with various components of traditional liquid laundry compositions, whereas when incorporated in a polymer film as described herein the interaction is reduced or eliminated. That is, the polymer matrix that completely or at least partially envelops the microcapsules described herein can serve as an impediment to or barrier to contact between microcapsules and destabilizing components. Accordingly, in one type of embodiment, the microcapsule-containing film can be in proximity to or hold (as in a pouch made from the film) a cleaning active that would otherwise degrade the stability of the perfume microcapsules.

Methods of Use

The films and articles described herein, as well as compositions contained therein, may be used to treat a substrate, e.g., fabric, for example by contacting the substrate with the film, article, and/or composition contained therein. The contacting step may occur manually or in an automatic machine, e.g., an automatic (top or front-loading) laundry machine. The contacting step may occur in the presence of water, which may be at a temperature up to about 80° C., or up to about 60° C., or up to about 40° C., or up to about 30° C., or up to about 20° C., or up to about 15° C., or up to about 10° C., or up to about 5° C. As noted above, the present films and articles made therefrom are particularly suited for cold water dissolution and therefore provide benefits in cold-water washes (e.g., from about 1° C. to about 30° C., or from about 5° C. to about 20° C.). The contacting step may be followed by a multi-rinse cycle or even by a single rinse cycle; because the film has good dissolution properties, less water is required to dissolve the film and/or release the contents contained therein.

As mentioned above, incorporating the perfume microcapsules into the polymer film (e.g. a water soluble film) can reduce negative interactions with the incompatible components (e.g. polyols) that can be contained in a package made from the film, e.g. components present in a detergent. The negative interactions with polyols in a detergent would degrade the capsules and prematurely release the additives, resulting in diminished long term performance.

By use of the films described herein with the microcapsules described herein, a detergent pouch can be made that stabilizes fragrance-containing microcapsules, while maintaining a single unit dose pouch configuration. The detergent pouch can be made of water soluble polymer and placed into a washing machine, e.g. a laundry washing machine. When water comes into contact with the pouch, the polymer dissolves, releasing the cleaning agents and the encapsulated fragrance. The fragrance-containing microcapsules are engineered to a particular diameter which allows for optimal deposition on textiles. Once deposited onto a textile (soft surface), the microcapsules are designed to rupture, and release the target additive (e.g. fragrance) upon applied mechanical force such as folding, crumpling, rubbing, and the like of the textile.

EXAMPLES

The following examples are provided for illustration and are not intended to limit the scope of the invention.

Example 1—Stability of Perfume Microcapsules in Film and Effect of Particle Size Polyvinyl alcohol films were made with perfume-loaded microcapsules of various sizes in order to determine a threshold microcapsule particle size in film for good olfactive performance and mechanical properties.

Polyvinyl alcohol films were made using a polyvinyl alcohol film formulation made with a 4 mol % carboxylate-modified polyvinyl alcohol resin having a degree of hydrolysis of 99.5% and a viscosity of 17-23 cP (measured at 20° C. with respect to a 4% by weight aqueous solution thereof), and also including fillers, surfactant, plasticizers, and process aids. Each film included 12 wt. % perfume microcapsules and the films had the same thickness. The base film formulation was identical in each sample, while the perfume microcapsules differed in size.

The perfume microcapsules for Examples 1-4 can be made according to Example 6 below and is a terpolymer comprising polyamine moieties, alkylene/alkylenoxy moieties and urea, with the characteristics in Table 1 below, and particle size distributions shown in FIG. 1.

TABLE 1

| Example | Ac1 | Ac2 | Ac3 | Ac4 |
|---|---|---|---|---|
| d50 (μm) | 20.6 | 16.7 | 12.4 | 9.9 |
| d90 (μm) | 36.5 | 30 | 22.6 | 18.3 |
| Ratio of shell weight (expressed in % by weight of the total capsule weight: shell material + core material) to the average diameter (μm$^{-1}$) of the microcapsule | 0.34 | 0.42 | 0.56 | 0.70 |
| fragrance loading (% w/w in slurry) | 40.4 | 40.6 | 40.4 | 40.4 |

The perfume microcapsule slurries contained approximately 40 wt % microcapsules with the balance comprising primarily water without any dispersing aids or preservatives. The perfume microcapsule content was selected to yield an equivalent perfume oil content in each film (film in this example being the dispersing medium), of about 12%. All the films were analyzed to know exactly their encapsulated oil loading. Afterwards, the required amount of film was cut to provide 0.07 g of perfume microcapsules (equivalent to a recommended dosage for liquid detergent; i.e. 0.5% slurry of a 35 g dose). The perfume oil content was determined by dissolving a film sample, treating the resulting solution with an ultrasonic bath to break the microcapsules, extracting the perfume oil from the solution by solvent extraction, and quantifying the oil content by chromatography.

The films were made by standard dissolution, mixing, and degassing procedures for creation of water-soluble film formulations. After the base formulation was degassed, the desired perfume microcapsules were added and the combination was slowly mixed until homogenous, taking care not to introduce air. The films were cast to a nominal thickness of 3 mil (76 μm) and to a residual water content of about 7.25 wt. %.

Samples of the perfume microcapsule slurries alone in an unperfumed liquid detergent base, and having an equivalent amount of perfume oil, were stored for one month at 4° C., and at 37° C. The mixture of unperfumed liquid detergent base with microcapsule-containing film contained the following components (amounts by approximate weight based on the total weight of the mixture): 20% propylene glycol, 18.5% glycerol, 14.5% sodium lauryl ether sulfate (+2EO), 5.1% benzenesulfonic acid, 5% lauric acid, 15% ethoxylated alcohol (C12-C15), 10% demineralized water, Q.S. monoethanolamine as a pH adjuster (target pH 7), a trace amount of antimicrobial, and about 12-15% polyvinyl alcohol film.

After 1-month storage, samples of the films with detergent slurries (35 ml) were subjected to a standard EU washing procedure with four cotton terry towels. The films were 76 µm thick, with a surface area in a range of 45-55 cm². The towels measured 45 cm by 90 cm. The washing procedure was with 40° C. water; short program 2 rinsing cycles-1200 revolutions/min on a Miele Professional PW6065 washing machine.

Following the washing procedure, an olfactory test was performed on one wet towel sample from each set to assess the intensity of the perceived odor on a 5-point scale by an intern expert panel, and the results were recorded. The remaining towels were line-dried in a controlled room (temperature and humidity) and the olfactory test was repeated on a sample from each set. Finally, a dried sample from each set was rubbed with low to moderate shear stress and the olfactory test was repeated and results were recorded.

Figure 2:
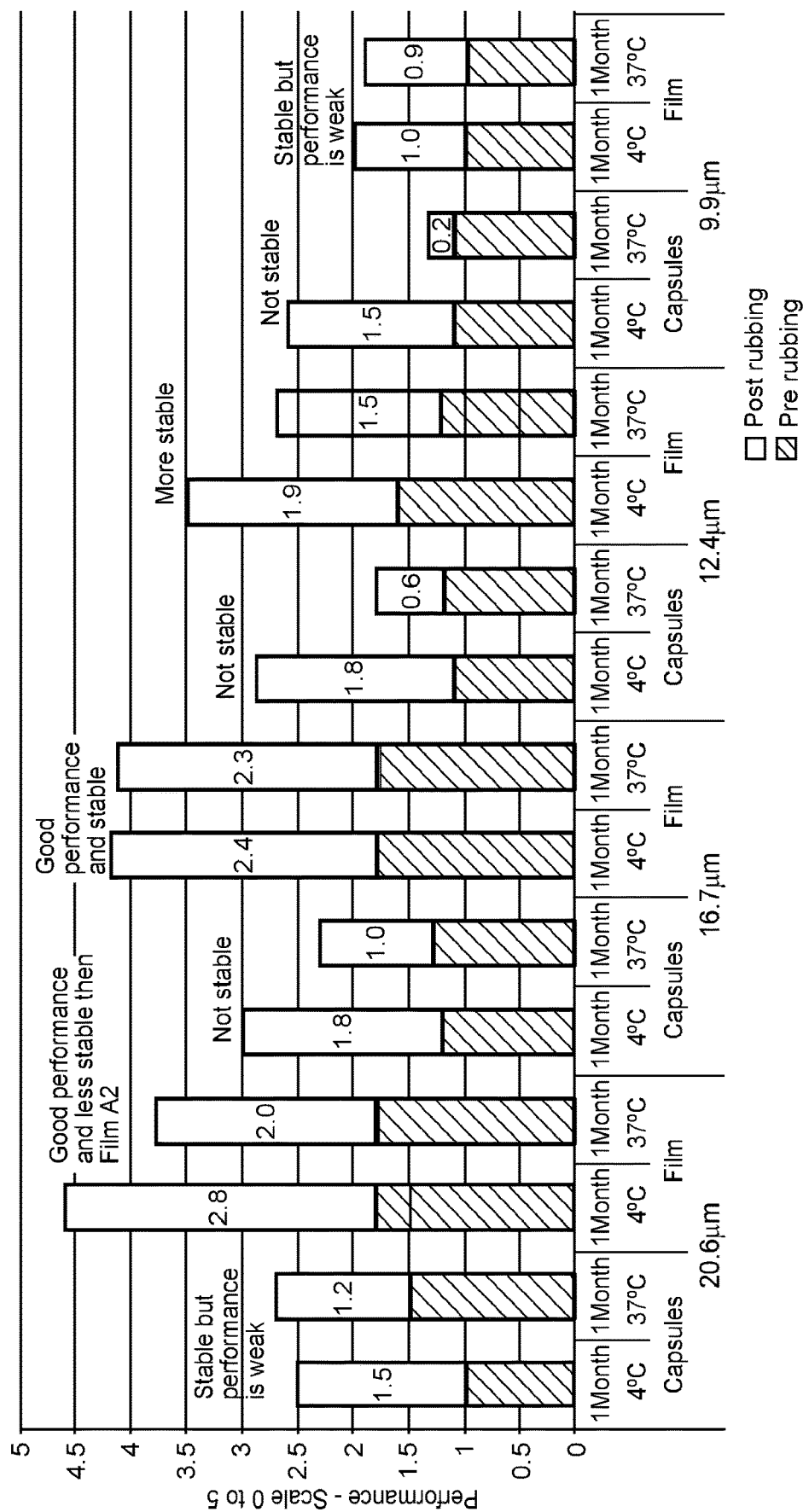
FIG. 2 shows olfactory performance results according to Example 1.

The olfactory performance results are graphed in FIG. 2. The results show that generally the film matrix stabilized the microcapsules through the storage, washing, and drying procedures, as compared to the microcapsules in the detergent slurry alone. For example, stability was shown by at least similar olfactory performance in 37° C. and 4° C. environments. The results also showed that generally the olfactory performance improved with larger particle sizes, despite the equivalent perfume oil loading. There was a significant olfactory boost for average particle sizes of 12.4, 16.7, and 20.6 µm.

At initial time, the perfume microcapsules in films were better performing than perfume microcapsules directly incorporated into the unperfumed base, with the exception for one slurry containing capsule size close to 15 µm. Significant perfume boost was noticeable for all films containing perfume microcapsules, except the smallest microcapsule size.

Stability tests in unperfumed base after 1 month at 4° C. and 37° C. confirmed the observations of the initial evaluation. Capsules directly added into the detergent base demonstrated some stability issues with performance decreasing over time and under the influence of temperature for all samples. Amongst the film samples, the film containing capsules close to 15 µm demonstrated the best performance.

Example 2—Effect of Perfume Microcapsule Loading on Olfactory Performance

Films of different sizes and containing perfume microcapsules were created as a proxy for different fragrance loadings, according to Table 2, below. The base film had a 12 wt. % microcapsule loading. For the films representative of 9 wt. %, 6 wt. %, and 3 wt. % loadings, different amounts of film (uniform thicknesses, different surface areas) were used in order to have a proxy for perfume microcapsule dosage in a finished package. Thus, the smaller surface area film used, the lower was the perfume microcapsule dosage, so that it was representative of a film having a lower actual loading. The films, and comparative capsule slurries at a slurry dosage of 0.5 and 0.25% per 35 g of unperfumed base were tested for olfactory performance.

TABLE 2

|  | microcapsule loading in film (% wt/wt) | | | |
| --- | --- | --- | --- | --- |
|  | 12 (actual) | 9 (representative) | 6 (representative) | 3 (representative) |
| film surface area (cm²) | 50 | 37.5 | 25 | 12.5 |
| Film linear density (g/cm²) | 0.01 | 0.01 | 0.01 | 0.01 |
| Microcapsule loading (g) | 0.06 | 0.045 | 0.03 | 0.015 |
| Slurry (g) | 0.15 | 0.1125 | 0.075 | 0.0375 |
| slurry (% wt per 35 g dose) | 0.5 | 0.375 | 0.25 | 0.125 |

The perfume microcapsules were Ac2 according to Example 1 above (d50=16.7 µm). The base film matrix, method of making the films, unperfumed liquid detergent base, EU washing procedure, drying conditions, and olfactory testing were the same as described above in connection with Example 1. The films were tested without aging. Thus, the tests measured the olfactory performance across various perfume microcapsule loading doses, alone and as incorporated into PVOH-based films, where the perfume microcapsule content per sample was based on the wt % of the microcapsule slurry per 35 g dose of liquid detergent base.

This experiment was carried out to evaluate the minimal perfume microcapsule dosage to have per pouch, to have a noticeable effect of fragrance release upon rubbing a laundered textile, including evaluation of the difference of fragrance perception between the pre-rub stage and the post-rub stage.

Figure 3:
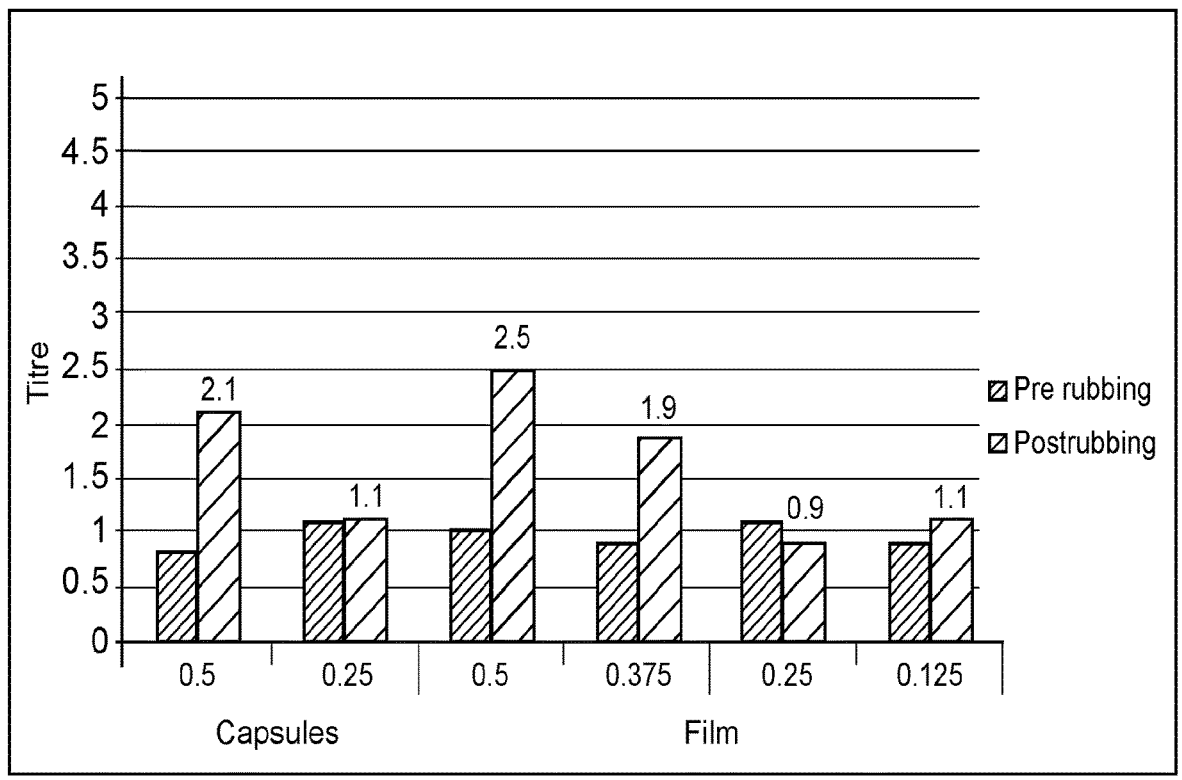
FIG. 3 shows the results of tests to determine the relationship between olfactory performance and microcapsule concentration in water-soluble films.

As described above, different amounts of film (uniform thicknesses, different surface areas) were used in order to have a proxy for perfume microcapsule dosage in a finished package. Thus, the smaller surface area film used, the lower was the perfume microcapsule dosage. The results are shown in FIG. 3. Olfactory performance increased with increased perfume microcapsule loading levels. Films representing 9 wt. % perfume microcapsule loading provided a significant perfume boost according to the olfactory testing, based on comparison of the olfactory performance pre-versus post-rubbing. Films having 12 wt. % perfume microcapsule loading provided significantly more olfactory performance than films representing 9 wt. % perfume microcapsule loading, comparing the olfactory performance pre-versus post-rubbing.

Example 3—Effect of Perfume Microcapsule Loading on Film Mechanical Properties Polyvinyl alcohol films were made with perfume-loaded microcapsules of identical size distributions but in different loading amounts in the films, in order to assess the effect of perfume microcapsule loading on the mechanical properties of the films (tear strength, tensile strength, Young's modulus at 10% strain (ASTM D882), and % elongation at break).

Polyvinyl alcohol films were made using a standardized plasticized polyvinyl alcohol film formulation as described in Example 1, and loaded with 3 wt. %, 6 wt. %, 9 wt. %, or 12 wt. % perfume microcapsules Ac2. An equivalent film containing no perfume microcapsules was also created for comparison. Films were conditioned at 23° C. and 35% RH for at least 24 hours prior to testing. The olfactory performance testing was performed the same as in Example 1.

The results are shown in Table 3 below.

TABLE 3

| Property | 0% microcaps | 3% microcaps | 6% microcaps | 9% microcaps | 12% microcaps |
|---|---|---|---|---|---|
| Testing Temperature (° C.) | 21.4 | 21.4 | 21.4 | 21.4 | 21.4 |
| Testing Relative Humidity (%) | 35.1 | 35.1 | 35.1 | 35.1 | 35.1 |
| Tear strength, machine direction (g/mil) n = 5 | 1344 | 1131 | 740 | 587 | 241 |
| Tensile strength, machine direction (N/mm$^2$) n = 5 | 31.2 | 27.7 | 24.1 | 21.4 | 17.0 |
| Modulus @ 10%, machine direction (N/mm$^2$) n = 5 | 28.5 | 27.8 | 27.7 | 28.7 | 28.3 |
| Elongation at Break, machine direction (%) n = 5 | 610.4 | 600.6 | 562.0 | 521.1 | 479.1 |
| olfactory performance grade, wet | 0 | 3.25 | 3.40 | 2.50 | 3.00 |
| olfactory performance grade, dry pre-rub | 0 | 1.00 | 1.20 | 1.00 | 1.10 |
| olfactory performance grade, dry post-rub | 0 | 1.10 | 0.90 | 1.80 | 2.60 |
| difference pre/post-rub | 0 | 0.10 | −0.3 | 0.80 | 1.5 |

Example 4—Effect of Film Gauge on Mechanical Properties

Polyvinyl alcohol films were made with perfume-loaded microcapsules of identical size distributions and loading amounts in the films, but with different film thicknesses, in order to assess the combined effect of perfume microcapsule inclusion and film thickness on film mechanical properties, and disintegration/dissolution properties. The film formulations were the same as in Example 1 above, and the film conditioning was the same as in Example 3 above. Corrected disintegration times were obtained by the formula corrected disintegration time (s)=disintegration time (s)/(measured film gauge/intended nominal film gauge)$^{1.93}$. Corrected dissolution times were obtained by the formula corrected dissolution (s)=dissolution time(s)/(measured film gauge/intended nominal film gauge)$^{1.83}$. Results are shown in Table 4 below.

TABLE 4

| Property | nominal 76 μm control | nominal 76 μm, Encap Ac2 | nominal 115 μm, Encap Ac2 | nominal 150 μm, Encap Ac2 |
|---|---|---|---|---|
| Testing Temperature (° C.) | 22.6 | 22.6 | 22.6 | 22.6 |
| Testing Relative Humidity (%) | 32.0 | 32.0 | 32.0 | 32.0 |
| Moisture Content (wt %) n = 3 | 6.82 | 5.94 | 6.06 | 5.15 |
| Tear strength, machine direction (g/mil) n = 5 | 1276 | 39 | 392 | 622 |
| Tear strength, transverse direction (g/mil) n = 5 | 1250 | 34 | 310 | 693 |
| Gauge (mil) n = 6 | 2.77 | 2.88 | 4.37 | 5.77 |
| Disintegration, 10° C. water (s) n = 3 | 26.7 | 24.0 | 47.7 | 85.3 |
| Dissolution, 10° C. water (s) n = 3 | 44.3 | 43.3 | 85.0 | 148.3 |
| Corrected Disintegration, 10° C. water (s) n = 3 | 31.2 | 25.9 | 50.5 | 92.1 |
| Corrected Dissolution, 10° C. water (s) n = 3 | 51.4 | 46.7 | 89.8 | 159.5 |
| Tensile strength, machine direction (N/mm$^2$) n = 5 | 36.5 | 19.1 | 21.8 | 25.1 |
| Modulus @ 10%, machine direction (N/mm$^2$) n = 5 | 31.6 | 26.9 | 24.3 | 25.1 |
| Elongation at Break, machine direction (%) n = 5 | 656.6 | 525.5 | 594.5 | 670.7 |
| Energy to Break, machine direction (J) n = 5 | 5.9 | 2.8 | 5.4 | 9.0 |
| Tensile strength, transverse direction (N/mm$^2$) n = 5 | 35.5 | 19.1 | 21.7 | 23.9 |
| Modulus @ 10%, transverse direction (N/mm$^2$) n = 5 | 29.7 | 26.5 | 23.3 | 24.8 |
| Elongation at Break, transverse direction (%) n = 5 | 662.9 | 519.6 | 595.0 | 636.7 |
| Energy to Break, transverse direction (J) n = 5 | 5.7 | 2.9 | 5.4 | 8.3 |

Example 5—Comparison with Other Perfume Microcapsules

The water-soluble film used in Example 5 is the same formulation shown in Example 1 with the microcapsule composition discussed below wherein the microcapsule content is 12 wt % by weight of the film of perfume microcapsules. The average diameter size (d50) of the perfume microcapsules is 15 μm. The ratio of shell weight to average diameter of the perfume microcapsule is less than 1 μm$^{-1}$ for the Encaps C discussed below and less than 0.7 μm$^{-1}$ for the Encaps Ab discussed below.

Water-soluble films were prepared containing 0.5% equivalent of slurry of a perfume microcapsule type disclosed in U.S. Patent Application Publication No. 2010/0009893 ("Encaps C") in comparison with perfume microcapsules according to the present disclosure ("Encaps Ab", having Architecture A). The Encaps C shell is a terpolymer. The polyamine moieties and alkylene/alkylenoxy moieties are common as between Encaps C and Encaps Ab. However, whereas Encaps C employs an aromatic polyol crosslinker, Encaps Ab uses urea instead.

Figure 4:
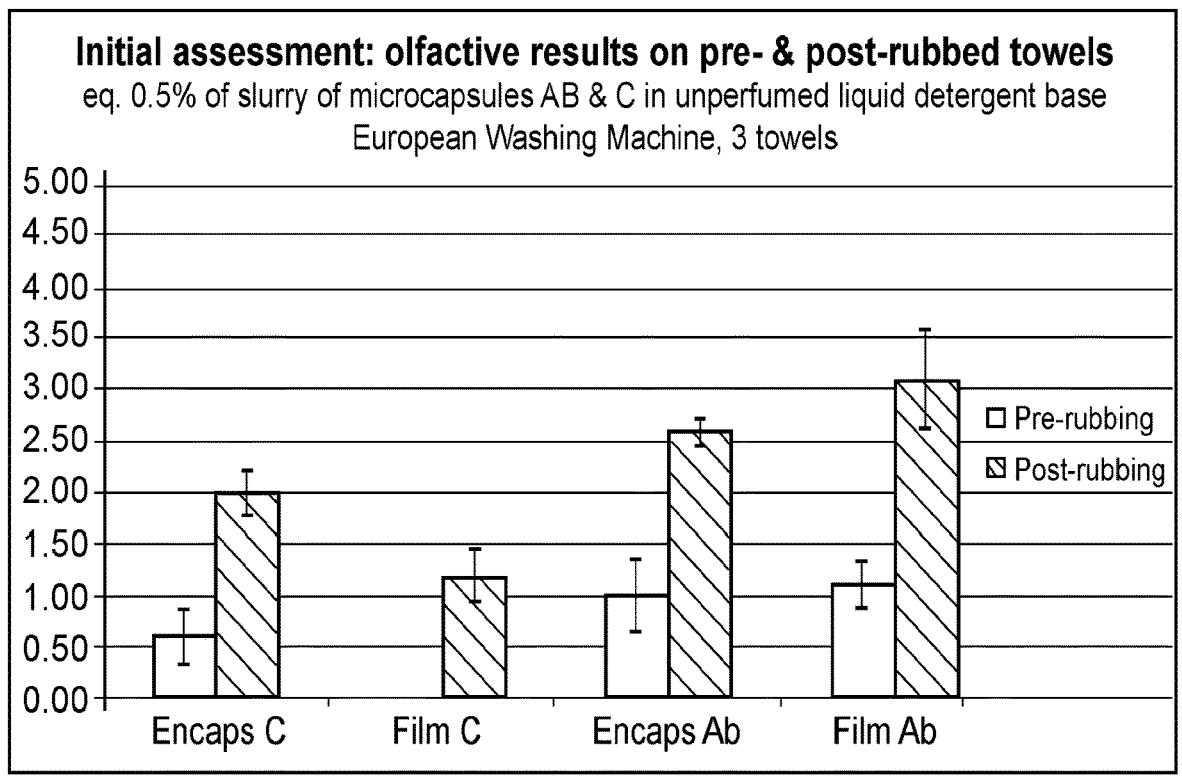
FIG. 4 shows the results of olfactive testing of microcapsule-containing films according to the present disclosure compared to films containing prior-known microcapsules.

The microcapsule-containing films were placed in the unperfumed liquid detergent base (as described above in paragraph [0206]) and washed with 3 cotton towels according to the EU washing procedure described in Example 1 and line-dried as described in Example 1. In parallel, the perfume microcapsules slurries alone (i.e., not in film) were placed in the unperfumed liquid detergent base and washed with 3 cotton towels the same way as the perfume microcapsule film samples. The towels were evaluated in a panel test for olfactory performance as described above. The results are shown in FIG. 4, and demonstrate that perfume microcapsules Ab (having Architecture A) are superior to perfume microcapsules C for use in films.

Example 6—Perfume Microcapsule Synthesis

Aminoplast microcapsules were prepared according to the following method:
1. Adding and dissolving a polymer stabilizer (ZeMac® E400, ex Vertellus) in water under moderate shear mixing.
2. Adjusting the temperature to 35±2° C., the pH to 4.6±2 with NaOH, then adding an alkylolated triamine pre-condensate (Luracoll SD, ex BASF), urea and perfume composition.
3. Emulsifying the system under moderate to high shear mixing, wherein the stirring speed and the geometry of the mixer is defined as a function of the desired average microcapsule size range (d50) and microcapsule size distribution (d90).
4. Increasing the temperature to 88° C.±1° C. over a period of 75 min, then leaving the reaction at 88 C±2° C. for 2 h 15 min.
5. Increasing the temperature to 88° C.±1° C. over a period of 75 min, then leaving the reaction at 88 C±2° C. for 35 min. Adding a second portion of the alkylolated triamine or triamine pre-condensate and formic acid.
6. Adding ethylene urea as formaldehyde scavenger while the slurry is still hot (88° C.) and then stirring for 10 min.
7. Cooling the system to room temperature.
8. Adding Carbopol ETD 2561 in solution and leaving the agitation constant 1 h, at 129 rpm, then adding NaOH and optionally adjusting the pH within the range from 6 to 6.6 with formic acid.

The foregoing description is given for clearness of understanding only, and no unnecessary limitations should be understood therefrom, as modifications within the scope of the invention may be apparent to those having ordinary skill in the art.

While the foregoing embodiments have been described in connection with perfume-containing microcapsules, in principle the invention is not so limited and is also contemplated to encompass microcapsules containing additives other than, or in addition to, perfumes.

Throughout the specification, where compositions are described as including components or materials, it is contemplated that the compositions can also consist essentially of, or consist of, any combination of the recited components or materials, unless described otherwise. Likewise, where methods are described as including particular steps, it is contemplated that the methods can also consist essentially of, or consist of, any combination of the recited steps, unless described otherwise. The invention illustratively disclosed herein suitably may be practiced in the absence of any element or step which is not specifically disclosed herein.

The practice of a method disclosed herein, and individual steps thereof, can be performed manually and/or with the aid of or automation provided by electronic equipment. Although processes have been described with reference to particular embodiments, a person of ordinary skill in the art will readily appreciate that other ways of performing the acts associated with the methods may be used. For example, the order of various steps may be changed without departing from the scope or spirit of the method, unless described otherwise. In addition, some of the individual steps can be combined, omitted, or further subdivided into additional steps.

All patents, publications and references cited herein are hereby fully incorporated by reference. In case of conflict between the present disclosure and incorporated patents, publications and references, the present disclosure should control.

What is claimed is:

1. A film having an average thickness in a range of about 5 μm to about 200 μm, and comprising a mixture of a water-soluble polymer, one or more plasticizers, and a plurality of fragrance-containing aminoplast resin microcapsules comprising a median (d50) particle size of at least about 12 μm and a shell comprising 75 to 100% by weight of an aminoplast resin that comprises 50 to 90% by weight of a terpolymer and 10-50% by weight of a polymeric stabilizer, wherein the terpolymer consists of:
   (a) 20 to 40% by weight of moieties derived from at least one triamine,
   (b) 25 to 60% by weight of moieties derived from at least one diamine, optionally urea; and
   (c) 19-35% by weight of moieties selected from the group consisting of alkylene and alkylenoxy moieties having 1 to 6 methylene units.

2. The film of claim 1, wherein the film average thickness is in a range of about 20 μm to about 100 μm.

3. The film of claim 1, wherein the water-soluble polymer comprises a polyvinyl alcohol.

4. The film of claim 3, wherein the polyvinyl alcohol includes an anionic functional group.

5. The film of claim 1, wherein the plasticizer comprises a polyol.

6. The film of claim 5, wherein the plasticizer is selected from the group consisting of glycerin, diglycerin, sorbitol, ethylene glycol, diethylene glycol, triethylene glycol, tetraethylene glycol, propylene glycol, polyethylene glycols having a molecular weight up to 400, neopentyl glycol, trimethylolpropane, water, and combinations thereof.

7. The film of claim 1, wherein the plasticizer is present in an amount in a range of about 10 wt. % to about 45 wt. % by weight of the film.

8. The film of claim 1, wherein the film further comprises a microcapsule dispersing aid selected from polysaccharides, pectin, alginate, arabinogalactan, carrageenan, gellan gum, xanthan gum, guar gum, acrylates/acrylic polymers, starches, water-swellable clays, acrylate/aminoacrylate copolymers, maltodextrin, natural gums, alginate esters, gelatine, protein hydrolysates and their quaternized forms, synthetic polymers and copolymers, poly(vinyl pyrrolidone-co-vinyl acetate), poly(vinyl alcohol-co-vinyl acetate), poly(maleic acid), poly(alkyleneoxide), poly(vinylmethylether), poly(vinylether-co-maleic anhydride), poly-(ethyleneimine), poly((meth)acrylamide), poly(alkyleneoxide-co-dimethylsiloxane), poly(amino dimethylsiloxane), and combinations thereof.

9. The film of claim 1, wherein the plurality of microcapsules are present in an amount in a range of 3 wt. % to 50 wt. % of the film.

10. The film of claim 1, wherein the microcapsules are characterized by a d50 particle size in a range of 12 μm to 50 μm.

11. The film of claim 1, wherein the microcapsules are characterized by a d50 particle size of at least 12 μm.

12. The film of claim 11, wherein the microcapsules are characterized by a d50 particle size of at least 16 μm.

13. The film of claim 1, wherein the microcapsules are characterized by a d50 particle size less than 33% of the film average thickness.

14. The film of claim 1, wherein the microcapsules are characterized by a d90 particle size less than 33% of the film average thickness.

15. The film of claim 1, wherein the microcapsules comprise multilayered shells.

16. The film of claim 1, wherein the microcapsule wall thickness is in a range of about 50 nm to about 500 nm.

17. The film of claim 1, wherein the average ratio of the microcapsule shell weight, expressed in % by weight of the total microcapsule weight to the sum of the shell material plus fragrance, to the microcapsule capsule diameter, expressed in microns, is about 0.7 microns$^{-1}$ or less.

18. The film of claim 1, wherein the fragrance in the microcapsules comprises 60 wt. % to 95 wt. % of the microcapsules, based on the total weight of the microcapsules.

19. The film of claim 1, wherein the terpolymer consists of moieties derived from melamine, urea, and formaldehyde.

20. The film of claim 1, wherein the aminoplast resin microcapsule is formed by a process comprising:
 (a) adding and dissolving polymer stabilizer in water under shear mixing;
 (b) adjusting the temperature and pH of the solution, then adding alkylolated triamine or triamine pre-condensate, diamine or diamine precondensate, and perfume;
 (c) emulsifying the system under shear mixing;
 (d) warming the emulsified system to an elevated temperature above the temperature of step (b), then holding the system at the elevated temperature for at least one hour;
 (e) adding ethylene urea as formaldehyde scavenger while the slurry is still at an elevated temperature above the temperature of step (b);
 (f) cooling the system; and
 (g) optionally adding a suspending agent then adding NaOH.

21. The film of claim 20, wherein,
in step (b) the temperature is adjusted to 35±2° C., the pH to 4.6±2; and
in step (d) the emulsified system is warmed to 88° C.±1° C. over a period of 75 min, then the reaction system is held at 88° C.±2° C. for 2 h 15 min.

22. The film of claim 1, wherein the film is a cast film.

23. The film of claim 22, wherein the cast film is also a thermoformed film.

24. A container comprising the film of claim 1, disposed as a wall of the container.

25. The container of claim 24, wherein the film has a surface area in a range of 25 cm$^2$ to 75 cm$^2$.

26. The container of claim 24, wherein the container has an interior volume of 35 ml or less.

27. The container of claim 24, wherein the container contains 35 ml or less of detergent.

28. The container of claim 27, wherein the detergent is a liquid detergent having a water content of 20 wt. % or less based on the total weight of the liquid detergent.

29. The container of claim 24, wherein the microcapsule content in the film is in a range of 0.03 g to 0.5 g.

30. A method of making a fragrance-containing water-soluble film according to claim 1, comprising: forming a mixed aqueous solution comprising a polymer resin and a plasticizer, optionally with heating; degassing the mixture; adding fragrance-containing microcapsules to the degassed solution to form a suspension; mixing the suspension; casting the suspension onto a surface; and allowing the suspension to substantially dry.

31. The method of claim 30, wherein the suspension comprising the fragrance-containing microcapsules, dissolved polymer, and plasticizer, is maintained at a temperature of 65° C. before casting.

32. The method of claim 30, wherein the mixing of the suspension comprising the fragrance-containing microcapsules, polymer resin, and plasticizer comprises stirring at 300 RPM or less.

33. The method of claim 30, wherein the mixing of the suspension comprising the fragrance-containing microcapsules, polymer resin, and plasticizer comprises passing the suspension through an inline mixer.

* * * * *

UNITED STATES PATENT AND TRADEMARK OFFICE
CERTIFICATE OF CORRECTION

| | |
|---|---|
| PATENT NO. | : 11,352,468 B2 |
| APPLICATION NO. | : 16/088174 |
| DATED | : June 7, 2022 |
| INVENTOR(S) | : David M. Lee et al. |

It is certified that error appears in the above-identified patent and that said Letters Patent is hereby corrected as shown below:

In the Claims

At Column 36, Line 35, "by weight of" should be -- of --.

Signed and Sealed this
Sixth Day of December, 2022

Katherine Kelly Vidal
*Director of the United States Patent and Trademark Office*